(12) United States Patent
Fang et al.

(10) Patent No.: US 8,702,357 B2
(45) Date of Patent: Apr. 22, 2014

(54) MULTI-PIECE DRILL HEAD AND DRILL INCLUDING THE SAME

(75) Inventors: X. Daniel Fang, Brentwood, TN (US); Jean-Luc Dufour, Franklin, TN (US); David J. Wills, Brentwood, TN (US)

(73) Assignee: Kennametal Inc., Latrobe, PA (US)

( * ) Notice: Subject to any disclaimer, the term of this patent is extended or adjusted under 35 U.S.C. 154(b) by 1056 days.

(21) Appl. No.: 12/368,339

(22) Filed: Feb. 10, 2009

(65) Prior Publication Data

US 2010/0202845 A1  Aug. 12, 2010

(51) Int. Cl.
 *B23B 51/00* (2006.01)
 *B23B 51/02* (2006.01)
(52) U.S. Cl.
 USPC .......................... 408/227; 408/713; 408/229
(58) Field of Classification Search
 USPC ......... 408/231, 232, 233, 227, 230, 223, 224, 408/225; 407/54, 33, 35, 40, 41, 42, 43
 See application file for complete search history.

(56) References Cited

U.S. PATENT DOCUMENTS

| | | | |
|---|---|---|---|
| 598,142 A | 2/1898 | Ferguson | |
| 748,890 A * | 1/1904 | Taylor | 408/224 |
| 1,499,584 A | 7/1924 | Litchfield | |
| 2,294,969 A | 9/1942 | Engvall et al. | |
| 2,351,827 A | 6/1944 | McAllister | |
| 2,891,429 A | 6/1957 | Tragge | |
| 2,858,718 A | 11/1958 | Kohler | |
| 2,927,614 A | 3/1960 | Ransom | |
| 3,040,605 A * | 6/1962 | Andreasson | 408/59 |
| 3,076,357 A | 2/1963 | Benjamin et al. | |
| 3,228,267 A | 1/1966 | Hebert | |
| 3,687,565 A | 8/1972 | Byers et al. | |
| 3,945,753 A | 3/1976 | Byers et al. | |
| RE28,900 E | 7/1976 | Byers et al. | |
| 4,060,335 A * | 11/1977 | Holloway et al. | 408/233 |
| 4,115,024 A | 9/1978 | Sussmuth | |
| 4,194,862 A * | 3/1980 | Zweekly | 408/224 |
| 4,230,429 A * | 10/1980 | Eckle | 408/186 |
| 4,248,555 A | 2/1981 | Satou | |
| 4,303,358 A * | 12/1981 | Grusa | 408/223 |
| 4,340,327 A * | 7/1982 | Martins | 408/59 |

(Continued)

FOREIGN PATENT DOCUMENTS

| | | |
|---|---|---|
| DE | 10054850 A1 | 5/2002 |
| EP | 123878 A1 * | 11/1984 |

(Continued)

OTHER PUBLICATIONS

Office Action mailed Aug. 23, 2013 in U.S. Appl. No. 13/179,662.

*Primary Examiner* — Eric A Gates
*Assistant Examiner* — Paul M Janeski
(74) *Attorney, Agent, or Firm* — Larry R. Meenan, Esq.

(57) ABSTRACT

One non-limiting aspect of the present disclosure is directed to a multi-piece spade drill head for a spade drill, wherein the spade drill includes an elongate body portion and a cutting portion removably secured to an end of the body portion. The multi-piece spade drill head includes at least two insert pieces, each piece including a cutting edge. The at least two insert pieces are configured to be removably secured to the body portion of the spade drill adjacent one another and with the cutting edges of the insert pieces aligned to together form a cutting edge on an end of the spade drill.

45 Claims, 12 Drawing Sheets

(56) References Cited

U.S. PATENT DOCUMENTS

| | | | | |
|---|---|---|---|---|
| 4,355,932 | A | 10/1982 | Koppelmann et al. | |
| 4,561,812 | A | 12/1985 | Linden | |
| 4,586,858 | A * | 5/1986 | Kubota | 408/224 |
| 4,687,387 | A * | 8/1987 | Roos | 408/144 |
| 4,976,325 | A | 12/1990 | Garbarino | |
| 5,094,574 | A | 3/1992 | Ekerot | |
| 5,399,051 | A | 3/1995 | Aken et al. | |
| 5,425,604 | A | 6/1995 | Scheer et al. | |
| 5,458,210 | A | 10/1995 | Sollami | |
| 5,735,648 | A * | 4/1998 | Kleine | 408/144 |
| 5,788,431 | A | 8/1998 | Basteck | |
| 5,909,985 | A * | 6/1999 | Shiga et al. | 408/1 R |
| 6,044,919 | A | 4/2000 | Briese | |
| 6,095,725 | A | 8/2000 | Stahl | |
| 6,213,231 | B1 * | 4/2001 | von Haas | 175/394 |
| 6,224,302 | B1 | 5/2001 | Cole | |
| 6,511,265 | B1 | 1/2003 | Mirchandani et al. | |
| 6,527,486 | B2 | 3/2003 | Wiman et al. | |
| 6,601,659 | B2 | 8/2003 | Saitta et al. | |
| 6,616,387 | B2 * | 9/2003 | Schneider et al. | 408/211 |
| 6,626,614 | B2 | 9/2003 | Nakamura | |
| 6,655,882 | B2 | 12/2003 | Heinrich et al. | |
| 6,716,388 | B2 | 4/2004 | Bruhn et al. | |
| 6,913,428 | B2 * | 7/2005 | Kress et al. | 408/144 |
| 7,108,460 | B2 * | 9/2006 | Chang | 408/223 |
| 7,241,089 | B2 | 7/2007 | Mast et al. | |
| 7,244,081 | B2 * | 7/2007 | Johnson et al. | 408/224 |
| 7,267,513 | B2 | 9/2007 | Wiker et al. | |
| 7,306,410 | B2 | 12/2007 | Borschert et al. | |
| 7,556,458 | B2 | 7/2009 | Heilmann et al. | |
| 7,572,088 | B2 | 8/2009 | Biscay | |
| 7,841,811 | B2 | 11/2010 | Thiele et al. | |
| 8,057,135 | B2 | 11/2011 | Nordlin et al. | |
| 2003/0133763 | A1 * | 7/2003 | Kuroda et al. | 407/40 |
| 2004/0124016 | A1 | 7/2004 | Nuzzi et al. | |
| 2007/0042217 | A1 | 2/2007 | Fang et al. | |
| 2010/0278603 | A1 | 11/2010 | Fang et al. | |
| 2013/0017028 | A1 | 1/2013 | Fang et al. | |

FOREIGN PATENT DOCUMENTS

| | | |
|---|---|---|
| EP | 0123878 A1 | 11/1984 |
| EP | 0 353 214 A2 | 1/1990 |
| EP | 0358901 A1 | 3/1990 |
| EP | 1 280 625 B1 | 10/2007 |
| FR | 2878772 A1 | 6/2006 |
| JP | 62084912 A * | 4/1987 |
| JP | 2002103124 A * | 4/2002 |
| JP | 2008-279682 A1 | 11/2008 |
| WO | WO 92/12817 A1 | 8/1992 |
| WO | WO 2008/098636 A1 | 8/2008 |

* cited by examiner

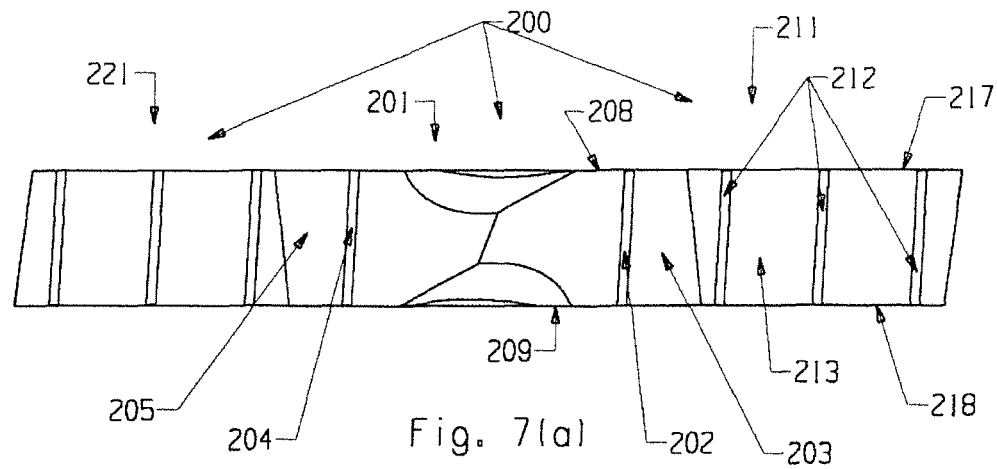
Fig. 7(a)
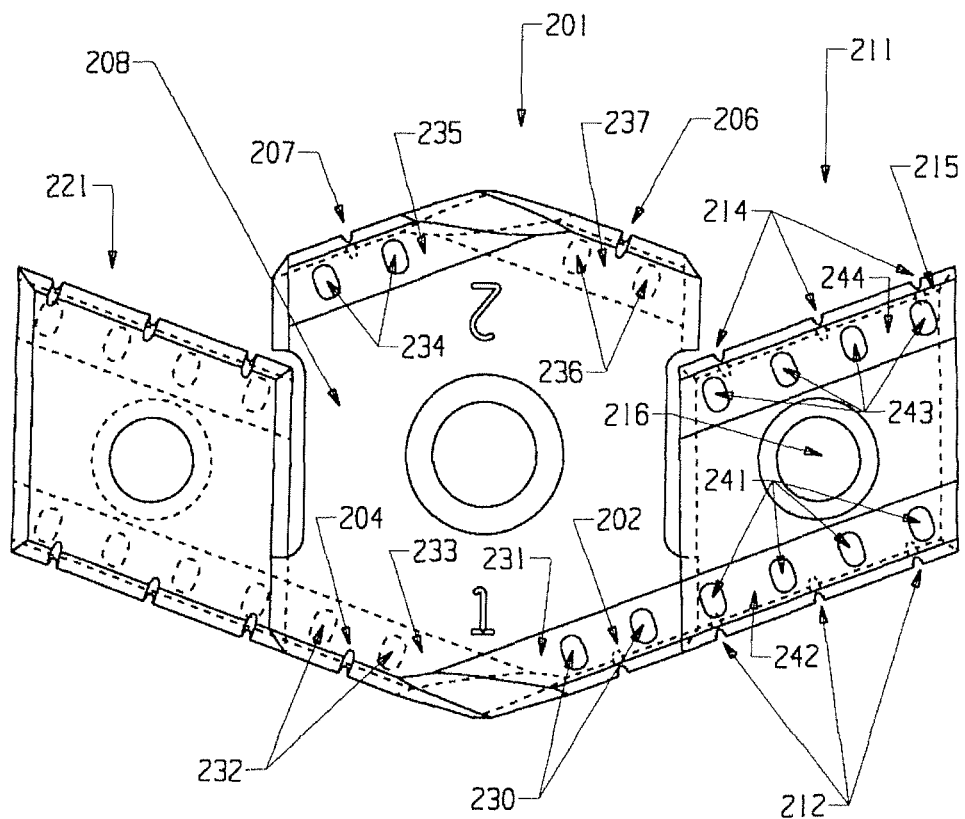
Fig. 7(b)
FIGURE 7

MULTI-PIECE DRILL HEAD AND DRILL INCLUDING THE SAME

BACKGROUND OF THE TECHNOLOGY

1. Field of Technology

The present disclosure relates to cutting tools used in machining operations. More particularly, the present disclosure relates to removable drill heads, and drills including removable drill heads.

2. Description of the Background of the Technology

Drilling is a common metal cutting operation in which material is removed from a workpiece to provide a bore in or through a workpiece. Drilling is carried out by advancing a rotating drilling tool or "drill" into the workpiece in the direction of the drill's longitudinal axis. Thus, a drill may be defined as a rotating cutting tool used for machining bores in or through a workpiece. Common drill configurations include twist drills and spade drills. A twist drill is characterized by helical flutes disposed along at least a portion of the length drill and which terminate at a working end of the drill (the "drill tip"), which includes two cutting edges. A spade drill includes a wide cutting blade at the drill tip and lacks helical flutes along its length.

With respect to design, there are four main types of drills. A first drill type is a single-piece solid drill having either a twist drill configuration or a spade drill configuration. Such a drill typically includes cemented carbide material or hard steel and may include a cutting tip or "drill head" composed of a very hard material that is soldered or brazed to a steel shank. An example of such a drill is provided in European Patent Publication No. 0 353 214, which discloses a solid drill particularly useful for percussive drilling and that comprises a hard drill head brazed within a slot formed on a tool body. U.S. Pat. No. 6,601,659 discloses a solid twist drill having a spiral-shaped hollow body and a relatively hard cutting tip brazed to the body. Such a drill provides a lightweight design suited for applications subjected to substantial torsion and impact, such as occurs during drilling of concrete and brickwork. U.S. Pat. No. 6,655,882 discloses a single-piece solid twist drill including an elongate body and that is adapted for certain metal working applications. U.S. Pat. No. 7,267,513 discloses a single-piece solid spade drill including threads and adapted to increase productivity in certain drilling applications.

A second drill type is an integrated drilling tool comprising multiple indexable cemented carbide inserts secured by screws or other fasteners on a steel drill body. As is known in the art, an indexable insert may be removably secured to a holder in two or more cutting orientations, each cutting orientation presenting a different cutting edge. Thus, an indexable insert may be "indexed" to present a different cutting edge to the workpiece when a cutting edge in use has become unacceptably worn or damaged. In certain embodiments of this second drill type, several indexable inserts may be arranged on a single steel body to provide a partially overlapping cutting action and form a complete drill cutting geometry. Representative examples are provided in European Patent No. 1 280 625, which discloses an integrated drilling tool having two identical square-shaped carbide cutting inserts removably mounted on a steel body. U.S. Pat. No. 5,788,431 discloses an integrated drilling tool comprising at least one triangle-shaped carbide cutting insert removably mounted on a steel body. U.S. Pat. No. 6,527,486 discloses an integrated drilling tool having multiple generally rectangular-shaped carbide cutting inserts removably mounted on a steel body.

A third drill type is an integrated drilling tool comprising a single replaceable drill head having a twist drill or spade drill configuration made of either cemented carbide or a hard steel, and wherein the drill head is mounted on a steel drill body. An example is disclosed in U.S. Pat. No. 4,355,932, which describes an indexable, single-piece spade drill head mounted on a steel drill body. U.S. Pat. No. 6,044,919 also discloses a single-piece spade drill head mounted on a steel drill body. U.S. Pat. No. 6,224,302 is directed to a single-piece spade drill head having a V-shaped end intended to better ensure secure attachment on the drill's steel tool body. U.S. Pat. No. 7,241,089 discloses a single-piece spade drill head having an improved geometry including curved cutting edges, and wherein the drill head is mounted on a steel drill body. U.S. Pat. No. 7,306,410 teaches a single-piece twist drill head that is clamped on a steel drill body. Also, European Patent No. 1 280 625 discloses a single-piece twist drill head mounted on a steel tool body and secured in place by two screws.

A fourth drill type is a composite drilling tool comprising two different cemented carbide materials metallurgically bonded together. Examples include a solid drill comprising a relatively harder cemented carbide material in the drill's core region, and a relatively wear-resistant cemented carbide material in the drill's peripheral region. U.S. Pat. No. 6,511,265 discloses a composite solid twist drill including regions of different cemented carbide materials providing differing mechanical properties in the core and surface regions of the drill. United States Patent Application No. 2007/0042217 discloses a single-piece spade drill head having a relatively impact resistant cemented carbide grade in a center region, and a relatively wear resistant cemented carbide grade in a peripheral region, and wherein the different cemented carbide materials are metallurgically bonded together.

A problem limiting the performance of non-composite drills is that the cutting speed (speed of the cutting edge relative to the workpiece) varies from zero at the drill's center to a maximum cutting speed at the drill's periphery. Therefore, the conditions promoting wear on a drill's cutting tip can be significantly more aggressive at the periphery than at the center of the cutting tip. To address this problem, certain known composite drills include different carbide grades, having different properties, in the drill's central and peripheral regions. Such an arrangement can be adapted to optimize drilling performance. The manufacturing costs of composite drills, however, are relatively high because manufacturing the drill involves the pressing and sintering of at least two different cemented carbide materials.

Accordingly, it would be advantageous to provide a drill having a construction that improves drilling performance, but which does not require the costly steps involved in manufacturing composite drills including multiple (i.e., two or more) regions of cemented carbide materials.

SUMMARY

One aspect of the present disclosure is directed to a multi-piece spade drill head for a spade drill, wherein the spade drill includes an elongate body portion and a cutting portion removably secured to an end of the body portion. The multi-piece spade drill head includes at least three insert pieces, each piece including a cutting edge. The at least three insert pieces are configured to be removably secured to the body portion of the spade drill adjacent one another and with the cutting edges of the insert pieces aligned to together form a cutting edge on an end of the spade drill.

Another aspect of the present disclosure also is directed to a multi-piece spade drill head for a spade drill, wherein the spade drill includes a body portion and a drill head removably secured to the body portion. The multi-piece spade drill head includes: a center insert piece forming a central region of the spade drill head, the center insert piece including first and second sides and a cutting edge; a first side insert piece forming at least a portion of a first side region of the spade drill head, the first side insert piece comprising a cutting edge and a mating surface configured to mate with at least a region of the first side of the center insert piece; and a second side insert piece forming at least a portion of a second side region of the spade drill head, the second side insert piece comprising a cutting edge and a mating surface configured to mate with at least a region of the second side of the center insert piece. The center insert piece, the first side insert piece, and the second side insert piece are each configured to be individually removably secured to the body portion with the mating surface of the first side insert piece mated to the first side of the center insert piece and the mating surface of the second side insert piece mated to the second side of the center insert piece. When secured to the body portion in this way, the cutting edge of the center insert piece is aligned with the cutting edge of each of the first side insert piece and the second side insert piece to together form a cutting edge on an end of the spade drill.

Yet another aspect of the present disclosure is directed to yet another multi-piece spade drill, wherein the spade drill includes an elongate body portion and a cutting portion removably secured to an end of the body portion. The multi-piece spade drill head includes a center insert piece including a V-shaped cutting edge, and a side insert piece including two side regions separated by a recess, each side region including a cutting edge. The center insert piece and the side insert piece are configured to be removably secured to the body portion of the spade drill with the center insert piece disposed in the recess of and mating with the side insert piece. When secured to the body portion in this way, the cutting edge of the center insert piece and the cutting edge of each of the side regions of the side insert piece are aligned to together form a cutting edge on a terminal portion of the spade drill.

According to certain non-limiting embodiments of a multi-piece spade drill head encompassed by the present disclosure, at least one of the insert pieces of the multi-piece spade drill head includes two cutting edges and is configured to be individually indexable and secured to the body portion of a spade drill in two cutting orientations. In each such cutting orientation a different cutting edge of the indexable insert piece is aligned with cutting edges of the remaining insert piece or pieces to form the cutting edge on an end of the spade drill when the inserts are removably secured to the body portion of the spade drill.

Also according to certain non-limiting embodiments of a multi-piece spade drill head encompassed by the present disclosure each of the insert pieces is made of material individually selected from a cemented carbide material and a hard steel. In certain non-limiting embodiments, at least two of the insert pieces of the multi-piece drill head are made of different materials. According to one such embodiment, a center insert piece is made of a first material and at least one side insert piece is made of a second material, wherein the second material has greater wear resistance than the first material.

An aspect of the present disclosure also is directed to spade drills including removable spade drill heads having any of the configurations encompassed by the present disclosure.

BRIEF DESCRIPTION OF THE DRAWINGS

Features and advantages of certain non-limiting embodiments of the inventions described herein may be better understood by reference to the accompanying drawings in which:

FIGS. 7(a) and 7(b) schematically depict various aspects of an additional non-limiting embodiment of a multi-piece spade drill head according to the present disclosure;

Figure 1:
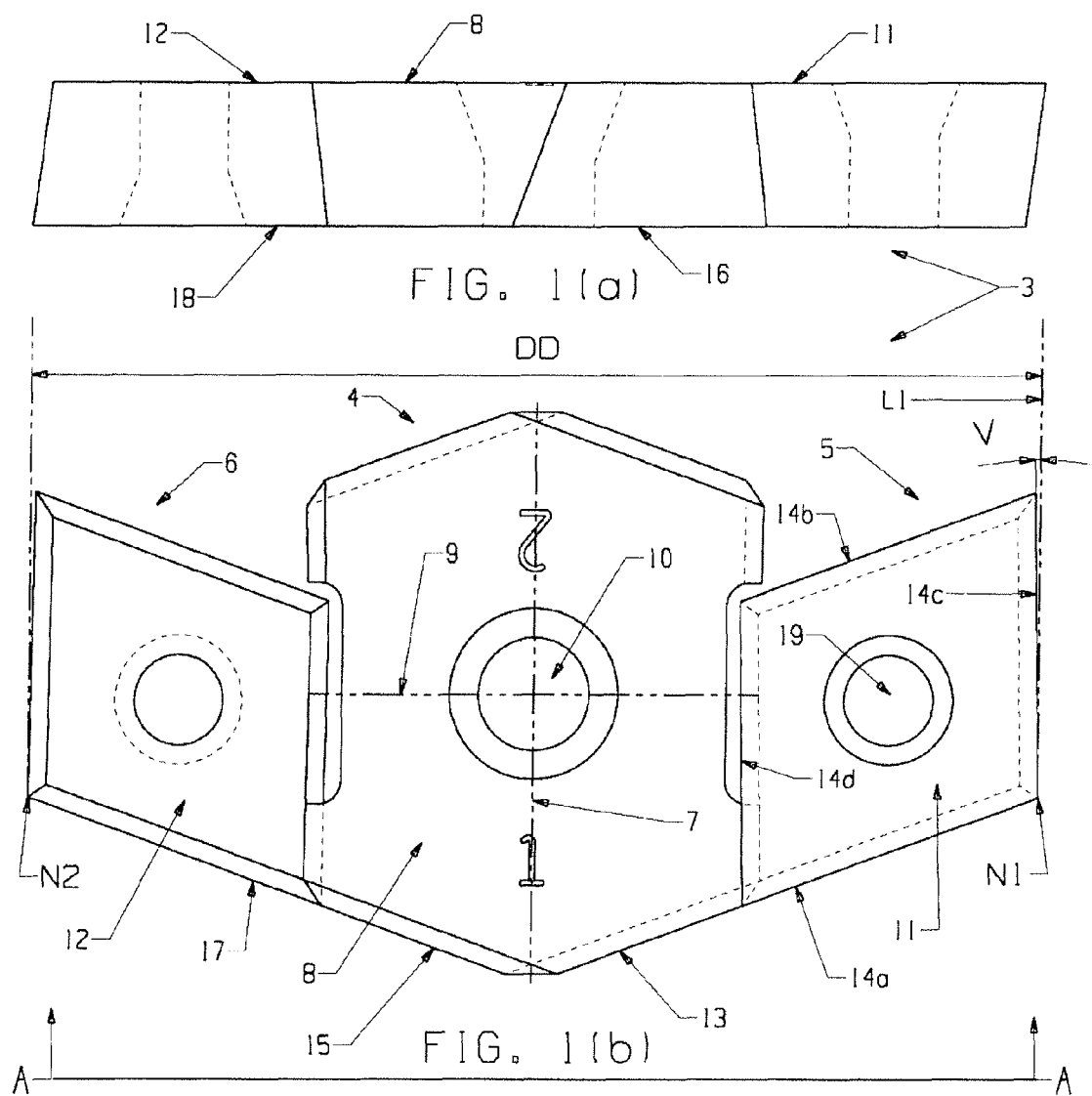
FIGS. 1(a) and (b) schematically depict various aspects of one non-limiting embodiment of a multi-piece spade drill head constructed according to the present disclosure.

The reader will appreciate the foregoing details, as well as others, upon considering the following detailed description of certain non-limiting embodiments of multi-piece (i.e., two or more pieces) drill heads and drill assemblies according to the present disclosure. The reader also may comprehend certain additional details and advantages of the present invention upon carrying out or using the drill heads and drill assemblies described herein.

DETAILED DESCRIPTION OF CERTAIN NON-LIMITING EMBODIMENTS

In the present description of non-limiting embodiments and in the claims, other than in the operating examples or where otherwise indicated, all numbers expressing quantities or characteristics of ingredients and products, processing conditions, and the like are to be understood as being modified in all instances by the term "about". Accordingly, unless indicated to the contrary, any numerical parameters set forth in the following description may be varied depending upon the desired characteristics one seeks to obtain in the present invention. At the very least, and not as an attempt to limit the application of the doctrine of equivalents to the scope of the claims, any numerical parameter should at least be construed in light of the number of reported significant digits and by applying ordinary rounding techniques.

Any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference. Any material, or portion thereof, that is said to be incorporated by reference herein, but which conflicts with existing definitions, statements, or other disclosure material set forth herein is only incorporated to the extent that no conflict arises between that incorporated material and the existing disclosure material.

The meanings of certain terms used in the present description and claims are as follows:

As used herein, a "multi-piece" drill head or other article means that such article includes two or more pieces that are associated to form the article. It will be apparent form the following description, for example, that certain embodiments of the multi-piece drill head according to the present disclosure may include 2, 3, or more individual insert pieces that are associated to form the drill head.

As used herein, "mate" or "mated" means that at least a region of each of the referenced insert pieces are closely abutted together, but are not physically bonded together. Thus, as used herein, "mated" insert pieces may be individually removed from the drill assembly on which they are mounted.

As used herein, a "cemented carbide" material refers to a composite of a metal carbide hard phase dispersed throughout a continuous binder phase. The dispersed phase may comprise, for example and without limitation, grains of one or more transition metals selected from titanium, vanadium, chromium, zirconium, hafnium, molybdenum, niobium, tantalum and tungsten. The binder phase that binds or "cements" the metal carbide grains together may be, for example and without limitation, at least one material selected from cobalt, nickel, iron, and alloys of these metals. Additionally, alloying elements such as, for example and without limitation, chromium, molybdenum, ruthenium, boron, tungsten, tantalum, titanium, and niobium may be included in the binder phase to enhance desired properties. Various cemented carbide materials may be produced by varying at least one of the compositions of the dispersed and continuous phases, the grain size of the dispersed phase, the volume fractions of the phases, and the method used to make the composite material. Cemented carbides based on a tungsten carbide dispersed hard phase and a cobalt or cobalt alloy binder phase are the most commercially important cemented carbide materials available.

Certain non-limiting embodiments of multi-piece drill heads according to the present disclosure are schematically depicted in the attached figures. Three-piece spade drill head 3 is shown in an end view in FIG. 1(a) and in a face view in FIG. 1(b). The perspective of FIG. 1(a) is in the direction of arrows A-A in FIG. 1(b). The position of certain geometric features of drill head 3 that would be hidden in the views of FIGS. 1(a) and 1(b) are indicated in those figures by dashed lines. Drill head 3 includes three individual insert pieces in the forms of center insert piece 4, side insert piece 5 (to the right of vertical reference line 7 in FIG. 1(b)), and side piece insert 6 (to the left of line 7). Center insert piece 4 is indexable and can be used in drill head 3 in the cutting orientation shown in FIG. 1(b), or can be rotated 180° about horizontal reference line 9 and used in a second cutting orientation, wherein a different cutting edge of the center insert piece 4 is presented to the workpiece. The indexable nature of center insert piece 4 is indicated by the indicia "1" and "2" on first face 8, which identify the two possible cutting orientations between which center insert piece 4 may be indexed.

Center insert piece 4 is 180° rotationally symmetric about a central axis that passes longitudinally through the center of fastener hole 10 and perpendicular to face 8. Side insert piece 5 and side insert piece 6 are identical in design and, as suggested in FIG. 1(a), each side insert piece 5,6 includes a first side face having a perimeter larger than an opposed second side face. The thickness of center insert piece 4 and side insert pieces 5 and 6 are identical. When the three insert pieces 4,5,6 are mated in the arrangement shown in FIGS. 1(a) and (b) to form drill head 3, face 8 of center insert piece 4 is substantially co-planar with face 11 of side insert piece 5 and with face 12 of side insert piece 6. Further, cutting edge 13 on face 8 of center insert piece 4 is collinear with front cutting edge 14a on face 11 of side insert piece 5, and cutting edge 15 on opposed face 16 of center insert piece 4 (see FIG. 1(a)) is collinear with front cutting edge 17 on face 18 (see FIG. 1(a)) of side insert piece 6.

As shown in FIG. 1(b), side insert piece 5 is generally diamond-shaped with parallel opposed cutting edges: front cutting edge 14a is parallel to front cutting edge 14b, and side cutting edge 14c is parallel to side cutting edge 14d. Side insert piece 5 is indexable and, in addition to the position shown in FIG. 1(b), may be disposed in a second cutting orientation, in which a different cutting edge is collinear with a cutting edge of the center insert piece 4 and is oriented to contact a workpiece. Specifically, side insert piece 5 may be placed in a second cutting orientation by rotating it 180° around a line that is perpendicular to face 11 and passes longitudinally through the center of fastener hole 19. In the second cutting orientation, side insert piece 5 remains on a side of drill head 3 that is to the right of reference line 7 as seen in FIG. 1(b). Alternatively, side insert 5 may be placed in an alternate cutting orientation by rotating it 180° about vertical reference line 7 and orienting it within drill head 3 in a position to the left side of reference line 7 in FIG. 1(b). Side cutting edge 14c of side insert piece 5 is oriented slightly tilted about point N1 relative to vertical line L1 in FIG. 1(b) to provide a small relief angle "V" relative to line L1.

Side insert piece 6 has a design identical to side insert piece 5 and may be indexed between multiple cutting orientation in a corresponding fashion. The distance between point N1 on side insert piece 5 and point N2 on side insert piece 6 is the drill diameter "DD", shown in FIG. 1(b), which dictates the diameter of the hole drilled by drill head 3.

Center insert piece 4 of drill head 3 has a unique geometry relative to side insert pieces 5 and 6 and is illustrated schematically in the end view of FIG. 2(a) and the face view of FIG. 2(b). The perspective of FIG. 2(a) is in the direction of arrows A-A in FIG. 2(b). In order to demonstrate how the center insert piece 4 is designed, FIGS. 2(a) and 2(b) include an XYZ coordinate system having an origin at the point "O" located at the center of fastener hole 24, as shown in FIG. 2(b), and at half the thickness "T" of center insert piece 4, as shown in FIG. 2(a). Center insert piece 4 includes first face 22 and opposed second face 23, and is 180° rotationally symmetric about the Y axis of coordinate system XYZ. With reference to FIG. 2(b), the length "L" of center insert piece 4 is defined as the distance "L" between theoretical lines 25 and 27 parallel to the X axis. The width "W" of center insert piece 4, also shown in FIG. 2(b), is defined as the distance between theoretical lines 26 and 28 parallel to the Z axis. As further shown in FIG. 2(b), the center angle "C" of center insert piece 4, shown in FIG. 2(b), is defined as the angle between lines extending along cutting edges 32 and 36 (or extending along cutting edges 38 and 42). The offset angle "V" of center insert piece 4 is defined as the angle between theoretical line 26 and edge 53 (or between any of theoretical line 26 and edge 62; theoretical line 28 and edge 56; and theoretical line 28 and edge 59).

Figure 2:
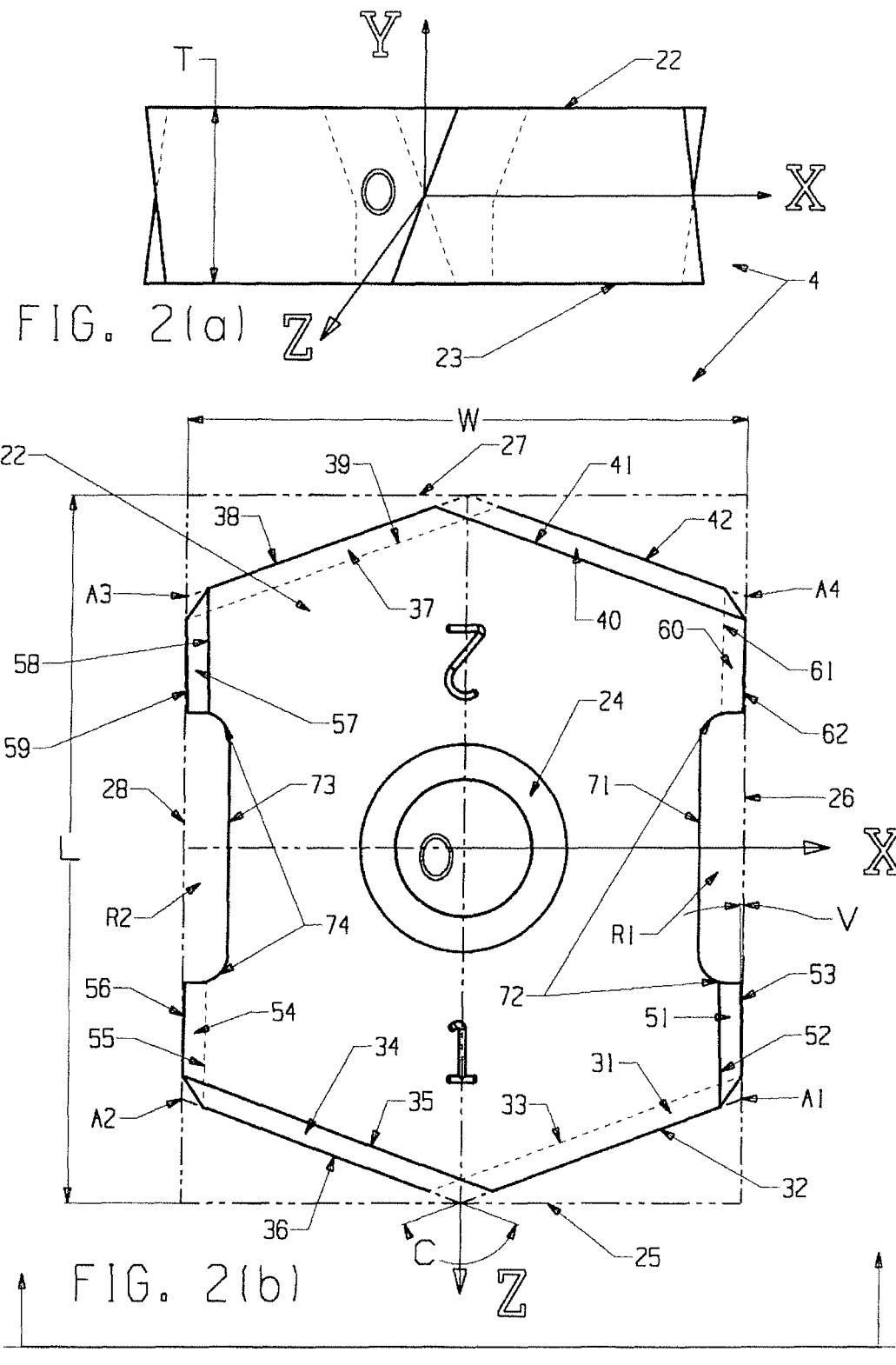
FIGS. 2(a) and (b) schematically depict various aspects of the center insert piece of the multi-piece spade drill head shown in FIGS. 1(a) and 1(b)

With reference to FIGS. 2(*a*) and 2(*b*), center insert piece 4 is further defined by a series of cutting clearance faces including: cutting clearance face 31, which extends between cutting edge 32 of first face 22 and edge 33 of second face 23; cutting clearance face 34, which extends between cutting edge 36 of second face 23 and edge 35 of first face 22; cutting clearance face 37, which extends between cutting edge 38 of first face 22 and edge 39 of second face 23; and cutting clearance face 40, which extends between cutting edge 42 of second face 23 and edge 41 of first face 22.

Again referring to FIGS. 2(*a*) and 2(*b*), center insert piece 4 of drill head 3 is further defined by a series of mating faces configured to mate center insert piece 4 with side insert pieces 5 and 6 when appropriately arranged to form drill head 3. Mating face 51 extends between edge 53 on second face 23 and edge 52 on first face 22. Edge 53 is rotated slightly in a counterclockwise direction (from the perspective of FIG. 2(*b*)) about point "A1" to define an offset angle "V" with theoretical line 26. Similarly, mating face 54 extends between edge 56 on first face 22 and edge 55 on second face 23, and edge 56 is rotated slightly in a clockwise direction (from the perspective of FIG. 2(*b*)) about point "A2" of theoretical line 28 to define an offset angle relative to theoretical line 28. Mating face 57 extends between edge 59 on second face 23 and edge 58 on first face 22, and edge 59 is rotated slightly in a counterclockwise direction (from the perspective of FIG. 2(*b*)) about point "A3" of theoretical line 28 to define an offset angle relative to theoretical line 28. Similarly, mating face 60 extends between edge 62 on the first face 22 and edge 61 on the second face 23, and edge 62 is rotated slightly in a clockwise direction (from the perspective of FIG. 2(*b*)) about point "A4" of theoretical line 26 to define an offset angle relative to theoretical line 26.

The center insert piece 4 is further defined by two recessed regions, shown in FIG. 2(*b*). A first recessed region R1 is bounded by straight edge 71 and rounded edges 72. A second recessed region R2 is bounded by straight edge 73 and rounded edges 74. One of the first and second recessed regions R1 and R2 separates the opposing mating faces 51 and 60 on one side of center insert piece 4, and the other of R1 and R2 separates the opposing mating faces 54 and 57 on another side of the center insert piece 4. As illustrated in FIG. 1(*b*), the first and second recessed regions R1 and R2 also provide a relief space between the center insert piece 4 and side inserts pieces 5 and 6 when the insert pieces are arranged to form three-piece drill head 3.

Figure 3:
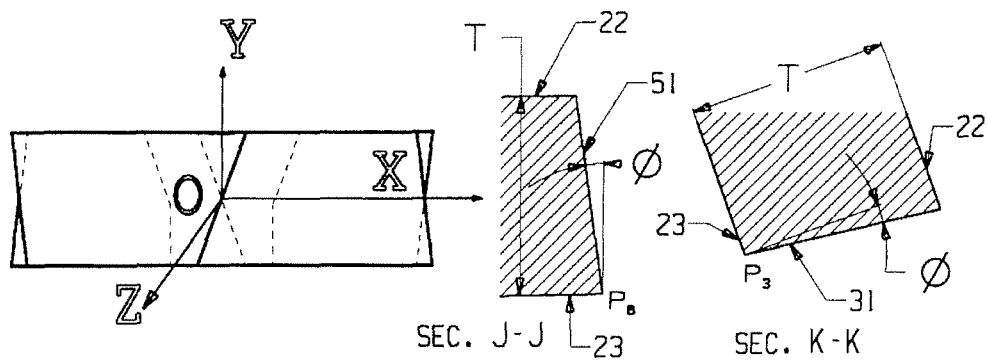
FIGS. 3(a)-(c) schematically depict various aspects of the center insert piece shown in FIGS. 2(a) and (b), and also show an XYZ coordinate system for defining various geometric aspects of the center insert piece.
Figure 3:
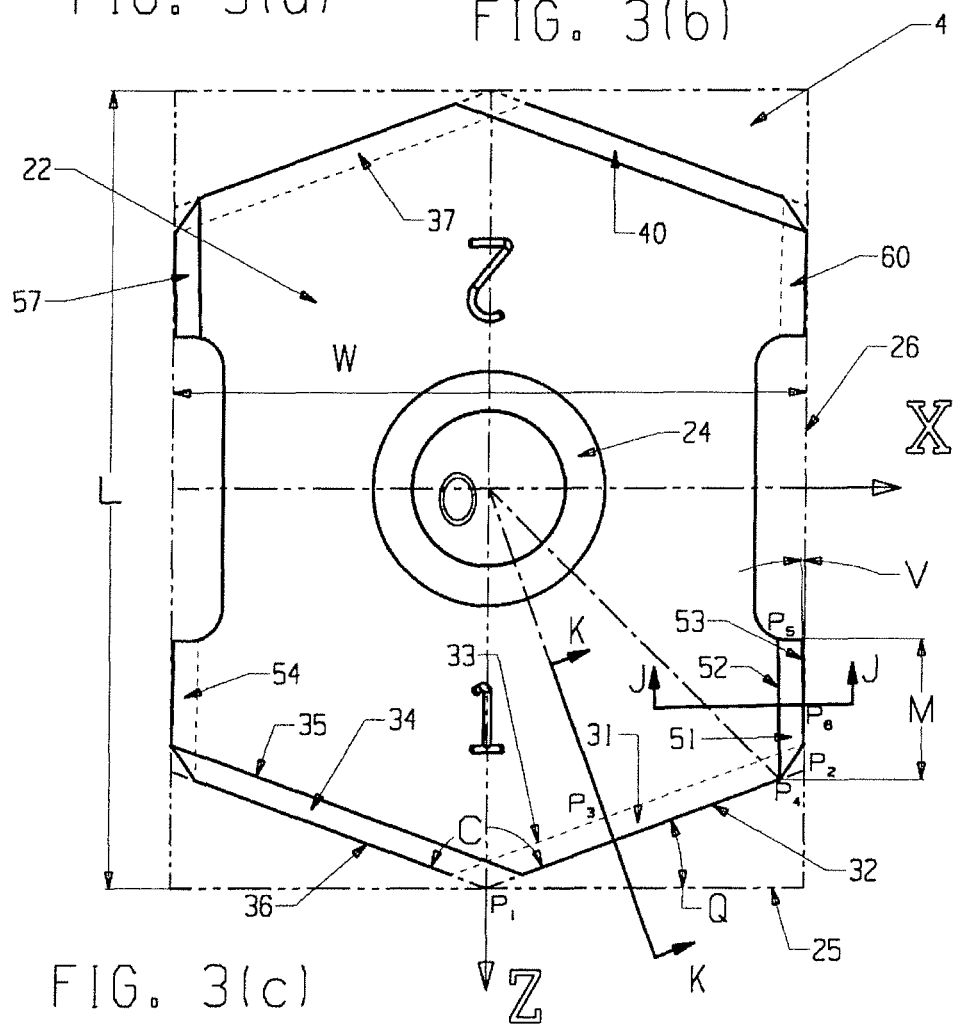

Center insert piece 4 of drill head 3 provides cutting action as the central portion of drill head 3 and also includes complementary mating geometry with the two side insert pieces 5 and 6 so as to form an integrated three-piece spade drill head. The geometry of the center insert piece 4 can be mathematically defined as a quantitative reference for the design of the assembled three-piece drill head 3. FIGS. 3(*a*)-(*c*) show aspects of center insert piece 4 and an XYZ coordinate system for defining the various aspects. In order to mathematically define a planar face like the cutting clearance face 31 shown in the schematic face view of FIG. 3(*c*), three non-collinear points in three-dimensional ("3-D") space are necessary. Such a planar face can be mathematically described as provided in equation (1):

$$f_{CCF}(X,Y,Z) = \begin{bmatrix} X & Y & Z & 1 \\ x_1 & y_1 & z_1 & 1 \\ x_2 & y_2 & z_2 & 1 \\ x_3 & y_3 & z_3 & 1 \end{bmatrix} = 0 \quad \text{Eq. (1)}$$

wherein $(x_1, y_1, z_1)$, $(x_2, y_2, z_2)$, and $(x_3, y_3, z_3)$ represent three non-collinear points in the XYZ coordinate system through which the planar face passes. Based on the XYZ coordinate system defined with respect to FIGS. 2(*a*) and 2(*b*), the origin "O" of the XYZ coordinate system is set at the center of the fastener hole 24 in the XOZ plane and at a point half way through the thickness of the insert piece 4 in the XOY plane. With reference to FIG. 3(*c*), three non-collinear points, $P_1$, $P_2$, and $P_3$, can be determined to define the cutting clearance face 31. $P_1(x_1, y_1, z_1)$ is the theoretical tip point of the center insert piece 4 and also the linear extension of the cutting edge 32 on the first face 22. $P_1$ may be defined as follows:

$$P_1(x_1, y_1, z_1) = (0, T/2, L/2) \quad \text{Eq. (2)}$$

$P_2(x_2, y_2, z_2)$ is the intersection point of the theoretical line 26 parallel to the Z axis and the linear extension of the front cutting edge 32 on the top face 22 of the center insert 4. Referring to FIG. 2(*b*), $P_2(x_2, y_2, z_2)$ is the same point A1 about which the edge 53 is slightly rotated to provide the offset angle V relative to theoretical line 26. $P_2$ may be defined as follows:

$$P_2(x_2, y_2, z_2) = (W/2, T/2, L/2 - (W/2) \times \tan(Q)) \quad \text{Eq. (3)}$$

wherein "Q" is the angle between cutting edge 31 on first face 22 and theoretical line 25 (which is parallel to the X axis) and is directly related to the center angle "C". With reference to the K-K sectional view in FIG. 3(*b*) and the side view of FIG. 3(*c*), the point $P_3(x_3, y_3, z_3)$ is at edge 33 (shown in dotted lines in FIG. 3(*c*)) on the second face 23 of center insert piece 4 and may be defined as follows:

$$P_3(x_3, y_3, z_3) = ([(L/2) \times \cos(Q) - T \times \tan(\phi)] \times \sin(Q), -T/2, [(L/2) \times \cos(Q) - T \times \tan(\phi)] \times \cos(Q)) \quad \text{Eq. (4)}$$

wherein $\phi$ is the clearance angle of the cutting clearance face 31 of the center insert piece 4. Because $P_3(x_3, y_3, z_3)$ is not collinear with $P_1(x_1, y_1, z_1)$ and $P_2(x_2, y_2, z_2)$, a planar face such as the cutting clearance face 31 can be exclusively determined. Thus, the cutting clearance face 31 can be mathematically defined by an expression as presented in above Eq. (1), which is in the format of a 4×4 matrix.

Because center insert piece 4 is 180° rotationally symmetric about the Y axis of the XYZ coordinate system in FIGS. 3(*a*)-(*c*), a form of mathematical method known as a geometric transformation can be introduced to define the remaining cutting clearance faces 34, 37, 40 of the center insert piece 4 shown in FIGS. 3(*a*)-(*c*). A geometric transformation involves the mathematical calculation of new coordinates for points forming an object from their original positions to their transformed positions. A geometric transformation relocates every point according to a specified rule, such as scaling, translation, reflection, or rotation, in a defined coordinate system.

Three non-collinear points $(x_1, y_1, z_1)$, $(x_2, y_2, z_2)$, and $(x_3, y_3, z_3)$ as defined above can be used to establish the cutting clearance face 31 of the center insert piece 4 shown in FIGS. 2(*a*)-(*b*) and 3(*a*)-(*c*). In a coordinate system XYZ as shown in FIGS. 2(*a*)-(*b*) and 3(*a*)-(*c*), the three points $(x_1, y_1, z_1)$, $(x_2,$ $y_2, z_2$), and ($x_3, y_3, z_3$) can be grouped into a point matrix format to represent the cutting clearance face 31, which is designated as "CCF1A", as follows:

$$CCF1A = \begin{bmatrix} x_1 & y_1 & z_1 & 0 \\ x_2 & y_2 & z_2 & 0 \\ x_3 & y_3 & z_3 & 0 \\ 0 & 0 & 0 & 1 \end{bmatrix} \quad \text{Eq. (5)}$$

A geometric transformation of three points through a rotation of θ=180° about the Y axis in a three-dimensional space can be expressed by the following point matrix:

$$R_Y(\theta = 180°) = \begin{bmatrix} \cos(\theta) & 0 & -\sin(\theta) & 0 \\ 0 & 1 & 0 & 0 \\ \sin(\theta) & 0 & \cos(\theta) & 0 \\ 0 & 0 & 0 & 1 \end{bmatrix} \quad \text{Eq. (6)}$$

$$= \begin{bmatrix} -1 & 0 & 0 & 0 \\ 0 & 1 & 0 & 0 \\ 0 & 0 & -1 & 0 \\ 0 & 0 & 0 & 1 \end{bmatrix}$$

The cutting clearance faces 31 and 37 are 180° rotationally symmetric about the Y axis, which is actually the indexable relationship between the drill cutting tip "1" (i.e., the portion of center insert piece 4 below the X axis as shown in FIGS. 2(b) and 3(c)) and the drill cutting tip "2" (i.e., the portion of center insert piece 4 above the X axis as shown in FIGS. 2(b) and 3(c)). Thus, the cutting clearance face 37, designated as "CCF2A", can be defined by the following matrix operation:

$$CCF2A = [CCF1A] \times [R_Y(\theta = 180°)] \quad \text{Eq. (7)}$$

$$= \begin{bmatrix} -x_1 & y_1 & -z_1 & 0 \\ -x_2 & y_2 & -z_2 & 0 \\ -x_3 & y_3 & -z_3 & 0 \\ 0 & 0 & 0 & 1 \end{bmatrix}$$

Further, a geometric transformation of three points through a rotation of θ=180° about the Z axis in a three-dimensional space can be expressed by the following point matrix:

$$R_Z(\theta = 180°) = \begin{bmatrix} \cos(\theta) & \sin(\theta) & 0 & 0 \\ -\sin(\theta) & \cos(\theta) & 0 & 0 \\ 0 & 0 & 1 & 0 \\ 0 & 0 & 0 & 1 \end{bmatrix} \quad \text{Eq. (8)}$$

$$= \begin{bmatrix} -1 & 0 & 0 & 0 \\ 0 & -1 & 0 & 0 \\ 0 & 0 & 1 & 0 \\ 0 & 0 & 0 & 1 \end{bmatrix}$$

The cutting clearance faces 31 and 34 are 180° rotationally symmetric about the Z axis of the XYZ coordinate system of FIGS. 2(a)-(b) and 3(a)-(c). This is because (i) cutting edge 36 on second face 23 must be identical to cutting edge 32 on first face 22, and (ii) cutting clearance face 34 must be extended from cutting edge 36 on second face 23 to edge 35 on first face 22 as a counterpart to cutting clearance face 31, which extends from cutting edge 32 on first face 22 to edge 33 on second face 23. Thus, these two identical cutting edges 36 and 32 and two identical cutting clearance faces 34 and 31 form the basic cutting geometry of the center portion of the drill head 3. Therefore, the cutting clearance face 34, designated as "CCF1B" can be defined by following matrix operation:

$$CCF1B = [CCF1A] \times [R_Z(\theta = 180°)] \quad \text{Eq. (9)}$$

$$= \begin{bmatrix} -x_1 & -y_1 & z_1 & 0 \\ -x_2 & -y_2 & z_2 & 0 \\ -x_3 & -y_3 & z_3 & 0 \\ 0 & 0 & 0 & 1 \end{bmatrix}$$

Finally, cutting clearance faces 40 and 34 are 180° rotationally symmetric about the Y axis of the XYZ coordinate system, providing for the indexable relationship between the drill cutting tip "1" and the drill cutting tip "2" as shown in FIGS. 2(b) and 3(c). Therefore, cutting clearance face 40, designated as "CCF2B", can be defined by the following matrix operation:

$$CCF2B = [CCF1B] \times [R_Y(\theta = 180°)] \quad \text{Eq. (10)}$$

$$= \begin{bmatrix} x_1 & -y_1 & -z_1 & 0 \\ x_2 & -y_2 & -z_2 & 0 \\ x_3 & -y_3 & -z_3 & 0 \\ 0 & 0 & 0 & 1 \end{bmatrix}$$

The four cutting clearance faces 31, 34, 37, and 40 of center insert piece 4 have now been defined. Mating faces 51, 54, 57, and 60, shown in FIGS. 2(b) and 3(c), which function as mating faces to properly align the two indexable side insert pieces 5 and 6 of the three-piece drill head 3, also can be defined. Three non-collinear points in 3-D space are necessary to mathematically define a planar face such as mating face 51. Such a planar face can be mathematically described as follows:

$$f_{CMF}(X, Y, Z) = \begin{vmatrix} X & Y & Z & 1 \\ x_4 & y_4 & z_4 & 1 \\ x_5 & y_5 & z_5 & 1 \\ x_6 & y_6 & z_6 & 1 \end{vmatrix} = 0 \quad \text{Eq. (11)}$$

wherein ($x_4, y_4, z_4$), ($x_5, y_5, z_5$), and ($x_6, y_6, z_6$) represent three non-collinear points in the XYZ coordinate system of FIGS. 2(a)-(b) and 3(a)-(c) through which the planar face passes. With reference to FIG. 3(c), three non-collinear points, $P_4$, $P_5$, and $P_6$, can be determined to define mating face 51, which comprises edge 52 on first face 22 and edge 53 on second face 23. $P_4$ ($x_4, y_4, z_4$) and $P_5$ ($x_5, y_5, z_5$) are located on opposed ends of edge 52, which is characterized by the length "M" shown in FIG. 3(c) and is slightly tilted counterclockwise about point P4 so as to be oriented at an offset angle "V" relative to theoretical line 26. P6 (x6, y6, z6) is on edge 53 (as shown in both FIG. 3(c) and in the J-J sectional view in FIG. 3(b)) and along the section line J-J which, as shown in FIG. 3(c), is through the midpoint of and perpendicular to edge 52. Points $P_4$, $P_5$, and $P_6$ can be mathematically expressed to define mating face 51 as follows:

$$P_4(x_4, y_4, z_4) = (W/2 - T \times \tan(Q), T/2, L/2 - (W/2 - T \times \tan(\phi) \times \tan(Q)) \quad \text{Eq. (12)}$$

$$P_5(x_5,y_5,z_5)=(W/2-T\times\tan(\phi)-M\times\sin(V),T/2,L/2-(W/2-T\times\tan(\phi))\times\tan(Q)-M\times\cos(V)) \quad \text{Eq. (13)}$$

$$P_6(x_6, y_6, z_6) = \quad \text{Eq. (14)}$$
$$(W/2 - T\times\tan(\phi) - M/2\times\sin(V) + T\times\tan(\phi)\times\cos(V),$$
$$-T/2, L/2 - (W/2 - T\times\tan(\phi))\times\tan(Q) -$$
$$M/2\times\cos(V) - T\times\tan(\phi)\times\sin(V))$$

Therefore, the complementary mating face 51 can be mathematically defined by above Equation (11) in the format of a 4×4 matrix. Three non-collinear points defined by $(x_4, y_4, z_4)$, $(x_5, y_5, z_5)$, and $(x_6, y_6, z_6)$ can be grouped into a point matrix format to represent mating face 51, designated as "CMF1A", as follows:

$$CMF1A = \begin{bmatrix} x_4 & y_4 & z_4 & 0 \\ x_5 & y_5 & z_5 & 0 \\ x_6 & y_6 & z_6 & 0 \\ 0 & 0 & 0 & 1 \end{bmatrix} \quad \text{Eq. (15)}$$

Mating faces 51 and 57 are 180° rotationally symmetric about the Y axis of the XYZ coordinate system of FIGS. 2(a)-(b) and 3(a)-(c) so that the center insert piece 4 is fully indexable. The center insert piece 4 may be indexed between a first cutting orientation in which cutting edges 32 and 36 of drill cutting tip region "1" (i.e., the portion of center insert piece 4 below the X axis in FIG. 3(c)) are presented to the workpiece, and a second cutting orientation in which the two cutting edges of drill cutting tip region "2" (i.e., the portion above the X axis) is presented to the workpiece. Thus, mating face 57, designated as "CMF2A", can be defined in the following expression by following a matrix operation regarding rotational geometric transformation:

$$CMF2A = [CMF1A] \times [R_Y(\theta = 180°)] \quad \text{Eq. (16)}$$
$$= \begin{bmatrix} -x_4 & y_4 & -z_4 & 0 \\ -x_5 & y_5 & -z_5 & 0 \\ -x_6 & y_6 & -z_6 & 0 \\ 0 & 0 & 0 & 1 \end{bmatrix}$$

Mating faces 51 and 54 are 180° rotationally symmetric about the Z axis according to the XYZ coordinate system shown in FIGS. 3(a) and (c). This is because in the arrangement shown in FIGS. 1(a) and (b), mating face 51 must mate with side insert piece 5 (shown in FIG. 1) and mating face 54 must mate with side insert piece 6 (also shown in FIG. 1). Therefore, mating face 54, designated as "CMF1B", can be defined by the following matrix operation:

$$CMF1B = [CMF1A] \times [R_Z(\theta = 180°)] \quad \text{Eq. (17)}$$
$$= \begin{bmatrix} -x_4 & -y_4 & z_4 & 0 \\ -x_5 & -y_5 & z_5 & 0 \\ -x_6 & -y_6 & z_6 & 0 \\ 0 & 0 & 0 & 1 \end{bmatrix}$$

Further, mating faces 54 and 60 are 180° rotationally symmetric about the Y axis according to the XYZ coordinate system shown in FIGS. 3(a) and (c) so that the center insert piece 4 is fully indexable between a first cutting orientation in which the cutting edges 32 and 36 of drill cutting tip region "1" (i.e., the portion of center insert piece 4 below the X axis in FIG. 3(c)) are presented to the workpiece, and a second cutting orientation in which the cutting edges of drill cutting tip region "2" (i.e., the portion above the X axis) are presented to the workpiece. Therefore, mating face 60, designated as "CMF2B", can be defined by following matrix operation:

$$CMF2B = [CMF1B] \times [R_Y(\theta = 180°)] \quad \text{(18)}$$
$$= \begin{bmatrix} x_4 & -y_4 & -z_4 & 0 \\ x_5 & -y_5 & -z_5 & 0 \\ x_6 & -y_6 & -z_6 & 0 \\ 0 & 0 & 0 & 1 \end{bmatrix}$$

Once Equation (1) and the related geometric transformation matrixes CCF1B, CCF2A, and CCF2B have been established, they can be used as a quantitative reference for the geometric design of all cutting clearance faces of the indexable center insert piece 4. Also, once Equation (11) and the related geometric transformation matrixes CMF1B, CMF2A, and CMF2B have been established, they can be used as a quantitative reference for the geometric design of all mating faces of the indexable center insert piece 4 and the two indexable side insert pieces 5 and 6.

Figure 4:
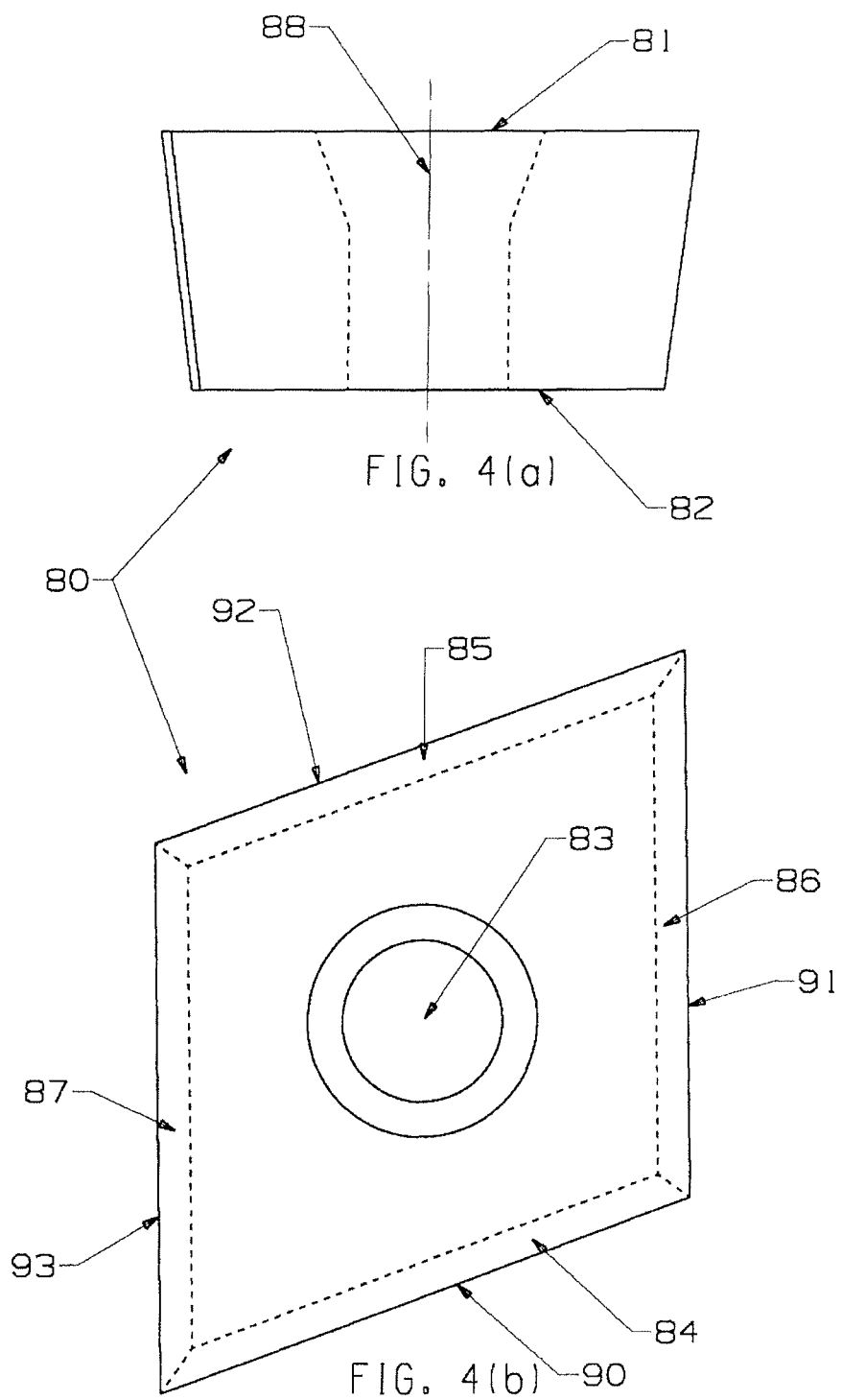
FIGS. 4(a) and (b) schematically depict various aspects of a non-limiting embodiment of a side insert piece for a multi-piece drill head according to the present disclosure.

Once center insert piece 4 has been designed based on the above equations, the side insert pieces 5 and 6 can be designed accordingly. FIGS. 4(a) and (b) illustrate a simplified side insert piece 80 based on side insert piece 5 of FIGS. 1(a) and (b). FIG. 4(a) is a side elevational view of side insert piece 80 showing the positions of certain hidden features in dotted lines. FIG. 4(b) is a face view showing the positions of certain hidden features in dotted lines. Side insert piece 80 includes first face 81, second face 82 (having a smaller perimeter than first face 82), center hole 83, front cutting clearance faces 84 and 85, and radial cutting clearance faces 86 and 87. Side insert piece 80 is 180° rotationally symmetric about center hole 83 and about the longitudinal axis 88 of center hole 83. Therefore, side insert piece 80 may be indexed between two cutting orientations. In other words, side insert piece 80 includes two pairs of usable cutting edges. A first pair of cutting edges includes cutting edges 90 and 91, and a second pair of cutting edges includes cutting edge 92 and 93. Radial clearance faces 86 and 87 of side insert piece 80 shown in FIGS. 4(a)-(b) have a complementary geometrical relationship allowing the clearance faces 86, 87 to mate with any of mating faces 51, 54, 57, and 60 of center insert piece 4 shown in FIGS. 3(a)-(c).

Figure 5:
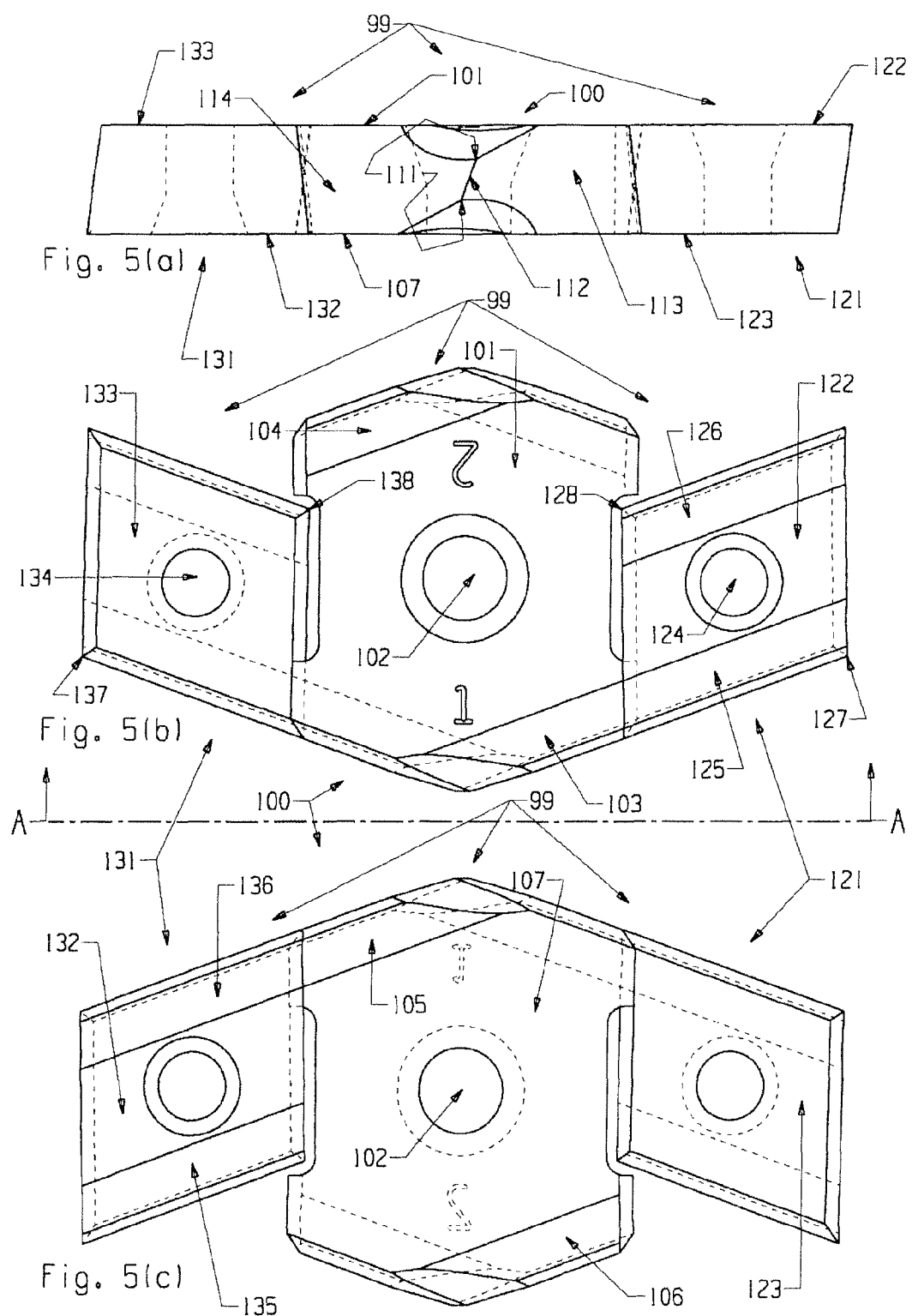
FIGS. 5(a)-(c) schematically depict various aspects of an additional non-limiting embodiment of a multi-piece spade drill head according to the present disclosure.

FIGS. 5(a)-(c) schematically depict an additional non-limiting embodiment of a multi-piece drill head according to the present disclosure. FIG. 5(b) is a first face view and FIG. 5(c) is a second face view of multi-piece spade drill head 99. FIG. 5(a) is an end view of drill head 99 taken in the direction of arrows A-A shown in FIG. 5(b). The positions of certain features of drill head 99 hidden in the perspectives shown in FIGS. 5(a)-(c) are shown in dotted lines. Center insert piece 100 of drill head 99 includes center hole 102 and is indexable between two cutting orientations, as indicated by the regions of first face 101 identified by numbers "1" and "2". With reference to FIG. 5(b), center insert piece 100 includes first chip groove 103 and second chip groove 104 on first face 101 in positions 180° rotationally symmetric about center hole 102. With reference to FIG. 5(c), second face 107 includes chip grooves 105 and 106 in positions 180° rotationally symmetric about center hole 102. With reference to FIG. 5(a), center insert piece 100 also includes web 111 and chisel edge 112. Web 111 is the central region of the drilling geometry at which front cutting clearance faces 113 and 114 meet. A thicker web provides greater drill tip strength for heavy drilling operations, while a thinner web promotes more efficient cutting and better chip ejection. Chisel edge 112 is the intersection of front cutting clearance faces 113 and 114 across web 111.

Side insert piece 121 includes: first face 122 (see FIG. 5(b)) that is substantially co-planar with first face 101 of center insert piece 100; second face 123 (see FIG. 5(c)); center hole 124; chip grooves 125 and 126 (see FIG. 5(b)) that are 180° rotationally symmetric about center hole 124; and rounded corners 127 and 128. Side insert piece 131 includes: first face 132 that is substantially co-planar with second face 107 of center insert piece 100; second face 133; center hole 134; chip grooves 135 and 136 that are 180° rotationally symmetric about center hole 134; and rounded corners 137 and 138. Side insert pieces 121 and 131 are identical in design. As suggested in FIG. 5(a), the perimeter of first face 132 is greater than the perimeter of second face 133 in side insert piece 131, and the perimeter of first face 122 is greater than the perimeter of second face 123 in side insert piece 121.

Figure 6:
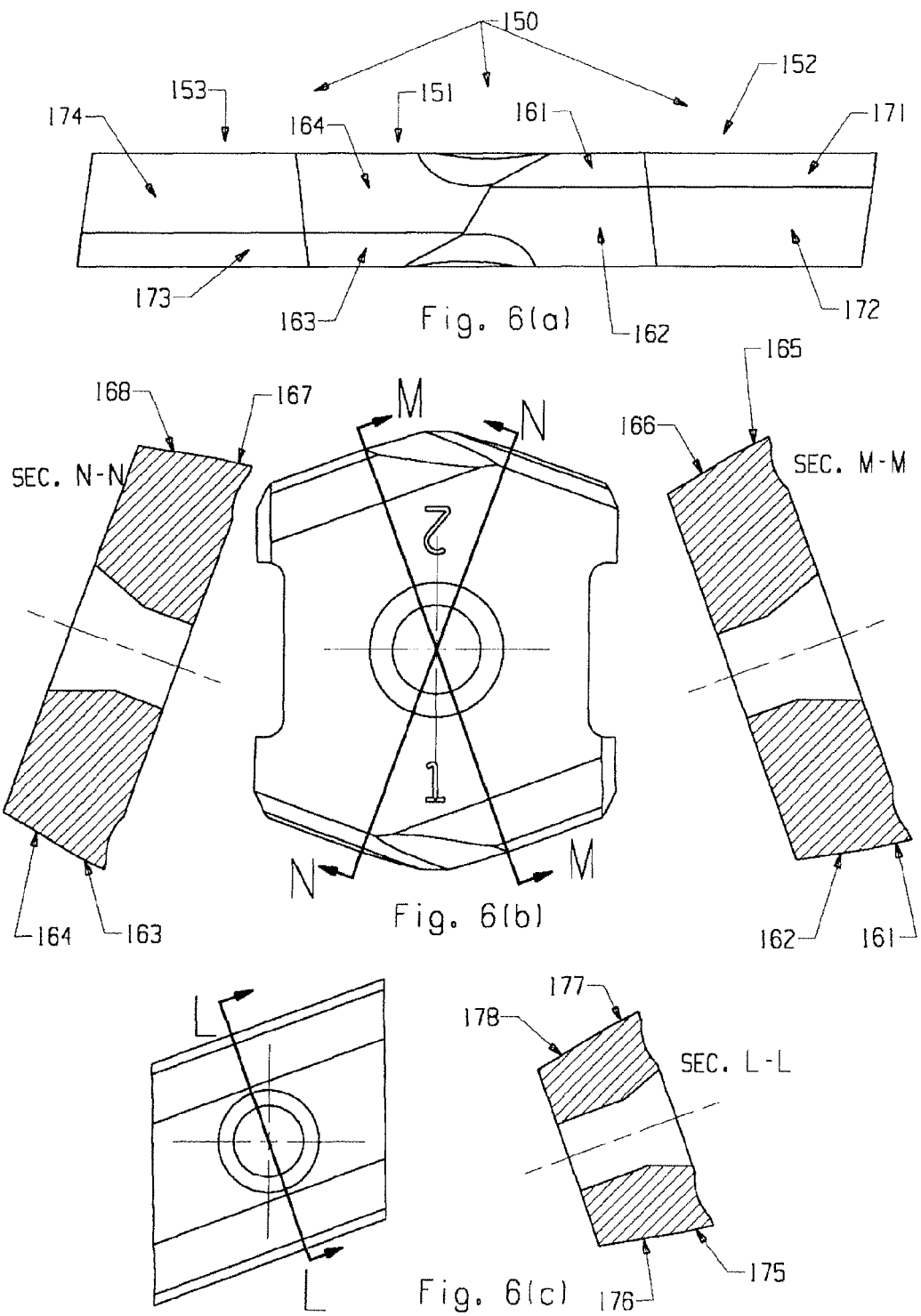
FIGS. 6(a)-(c) schematically depict various aspects of an additional non-limiting embodiment of a multi-piece spade drill head according to the present disclosure.

FIGS. 6(a)-(c) schematically depict various aspects of an additional non-limiting embodiment of a three-piece drill head according to the present disclosure. FIG. 6(a) is an end view schematically depicting the cutting end of three-piece drill head 150. Drill head 150 includes center insert piece 151 and side insert pieces 152 and 153. FIG. 6(b) is a schematic first face view of center insert piece 151, along with sectional views of center insert piece 151 taken at lines M-M and N-N in the direction of the arrows in the first face view. FIG. 6(c) schematically depicts a front face view of a representative side insert piece of drill head 150, along with a sectional view of the side insert piece taken at line L-L in the direction of the arrows in the first face view in FIG. 6(c). Each side insert piece 152 and 153 of drill head 150 has a design identical to that shown in FIG. 6(c) and, thus, FIG. 6(c) is representative of the construction of each of side insert pieces 152 and 153.

Drill head 150 shown in FIGS. 6(a)-(c) includes double cutting clearance faces (faces 161 and 162; and 163 and 164) on the center insert piece 151 and double clearance faces (171 and 172; and 173 and 174) on the front cutting clearances (as defined in FIG. 4(c) for front cutting clearance faces 84 and 85) of side insert pieces 152 and 153. As shown in FIG. 6(a) and the Sec. M-M and Sec. N-N views of FIG. 6(b), center insert piece 151 includes paired clearance faces on each of its four cutting clearance faces. Specifically, the cutting clearance faces include the following pairs of clearance faces: first clearance face 161 and second clearance face 162 (shown in Sec. M-M); first clearance face 163 and second clearance face 164 (shown in Sec. N-N); first clearance face 165 and second clearance face 166 (shown in Sec. M-M); and first clearance face 167 and second clearance face 168 (shown in Sec. N-N). Also, as shown in FIGS. 6(a) and 6(c), each side insert piece 152 and 153 includes double clearance faces on each of the front cutting clearance faces. Specifically, the inserts include the following paired cutting clearance faces: first clearance face 171 and second clearance face 172 (as shown on side insert piece 152 in FIG. 6(a)); and first clearance face 173 and second clearance face 174 (as shown on side insert piece 153 in FIG. 6(a)). With respect to the Sec. L-L view of the representative schematic side insert piece for drill head 150 shown in FIG. 6(c), first cutting clearance face 175 and second front cutting clearance face 176 form one pair, and first front cutting clearance face 177 and second cutting clearance face 178 (as shown in Sec. L-L view of FIG. 6(c), form a second pair.

FIGS. 7(a) and 7(b) schematically depict an additional non-limiting embodiment of a three-piece drill head according to the present disclosure. Drill head 200 is depicted in an end view in FIG. 7(a) and in a first face view in FIG. 7(b). Each of the center insert piece 201 and the side insert pieces 211 and 221 of the drill head 200 is indexable between two cutting orientations in which a different cutting edge of the particular insert piece is a region of the V-shaped cutting edge presented to a workpiece on which the drill head would be used. Each of insert pieces 201, 211, and 221 includes chip splitter features on the cutting clearance face and bumps inside the chip grooves. Center insert piece 201 includes a chip splitter structure on each of its cutting clearance faces as follows. As shown in FIG. 7(a) (in the region identified by indicia "1" in FIG. 7(b)), chip splitter structure 202 is provided on cutting clearance face 203, and chip splitter feature 204 is provided on cutting clearance face 205. As shown in FIG. 7(a), in the region identified by indexing indicia "2", chip splitter structures 206 and 207 are provided. Each of chip splitter structures 202, 204, 206, and 207 on center insert piece 200 extends from the first face 208 through to the second face 209. Side insert piece 211 includes three chip splitter structures 212 on front cutting clearance face 213 and three identical chip splitter structures 214 on front cutting clearance face 215, such that side insert piece 211 is 180° rotationally symmetric about center hole 216. All six chip splitter structures 212 and 214 on side insert piece 211 extend through the side insert piece from first face 217 to second face 218. The positioning and design of chip splitters structures is the same for side insert pieces 211 and 221, and both side insert pieces are 180° rotationally symmetrical about their respective center holes.

Three-piece spade drill head 200 includes multiple bumps in the chip grooves of the drill head 200 to enhance chip curling and chip breaking during the drilling process. As shown in FIG. 7(b), in the region of center insert piece 201 designated by number "1", two bumps 230 are provided in chip groove 231 on first face 208, and (as indicated by dashed lines) two bumps 232 are provided in chip groove 233 on second face 209. As also shown in FIG. 7(b), in the region of center insert piece 201 designated by index number "2", two bumps 234 are provided in chip groove 235 on first face 208, and (as indicated by dashed lines) two bumps 236 are provided in chip groove 237 on second face 209. As further shown in FIG. 7(b), side insert piece 211 includes four bumps 241 on chip groove 242 and four bumps 243 on chip groove 244, and the positions of the bumps 241 and 243 are 180° rotationally symmetric about center hole 216. As indicated in FIG. 7(b) by the dotted lines indicating the positions of hidden structures, side insert 221 includes bumps disposed identically to side insert piece 211. Given that the cutting edges of drill head 200 must be oriented to remove material from a workpiece as the drill head rotates, however, the orientation of side insert piece 221 is rotated 180° relative to center insert piece 201.

Figure 8:
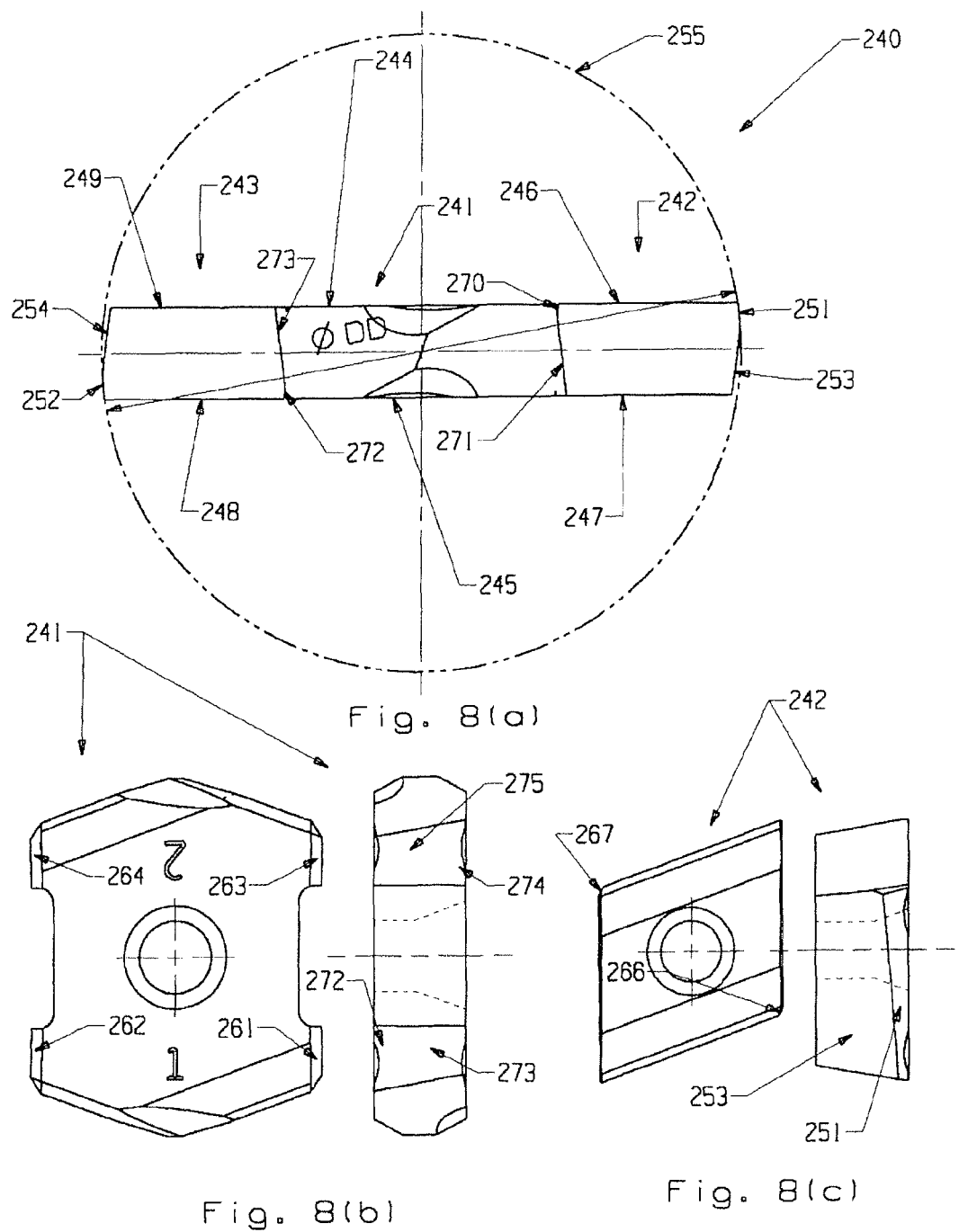
FIGS. 8(a)-(c) schematically depict various aspects of an additional non-limiting embodiment of a multi-piece spade drill head according to the present disclosure.

FIGS. 8(a)-(c) and 9(a)-(c) are schematic illustrations illustrating aspects of an additional non-limiting embodiment of a multi-piece spade drill head and a drill assembly according to the present disclosure. FIG. 8(a) is a schematic end view of the three-piece drill head 240, which includes center insert piece 241 and side insert pieces 242 and 243 flanking the center insert piece 241. The center insert piece 241 includes a first face 244 and a second face 245. FIG. 8(b) includes a schematic first face view and a side view of the center insert piece 241 of the drill head 240. FIG. 8(c) includes a first face view and a side view of side insert piece 242 of drill head 240. Side insert piece 242 includes a radial cutting clearance face (similar to radial cutting clearance faces 86 and 87 shown in FIG. 4(c)) including first clearance surface 251 proximate first face 246, and second clearance surface 253 proximate second face 247. Side insert piece 243 also includes a radial cutting clearance face including two cutting clearance faces, that is, first clearance surface 252 proximate first face 248 and second clearance surface 254 proximate second face 249. With reference to FIG. 8(a), first radial cutting clearance faces 251 and 252 are curved surfaces defining the drilling diameter 255 of the drill head 240, indicated as distance ODD. Side insert piece 242 also includes corner radii 266 and 267, indicated in FIG. 8(c). The designs of side insert piece 243 and side insert piece 242 are identical.

Mating faces 261, 262, 263, and 264 of center insert piece 241, shown in FIG. 8(b), are complementary to a radial cutting clearance face of the adjacent side insert piece 242 or 243. For example, first radial clearance face 251 and second radial clearance face 253 of side insert piece 242 are configured to mate with any of mating faces 261, 262, 263, and 264 of center insert piece 241 to allow indexing of the center insert piece 241 and the side insert piece 242. The same condition holds true with respect to the first and second radial clearance faces 252 and 254 of side insert piece 243. It can be seen in FIG. 8a (an end view) for the center insert 241 that the complementary mating face 261 has a first clearance face 270 and a second clearance face 271, and the complementary mating face 262 has a first clearance face 272 and a second clearance face 273. It can be seen in FIG. 8(b) (a first face view and a side view of the center insert piece 241) that complementary mating face 262 includes first clearance face 272 and second clearance face 273, and complementary mating face 264 includes first clearance face 274 and second clearance face 275.

Figure 9:
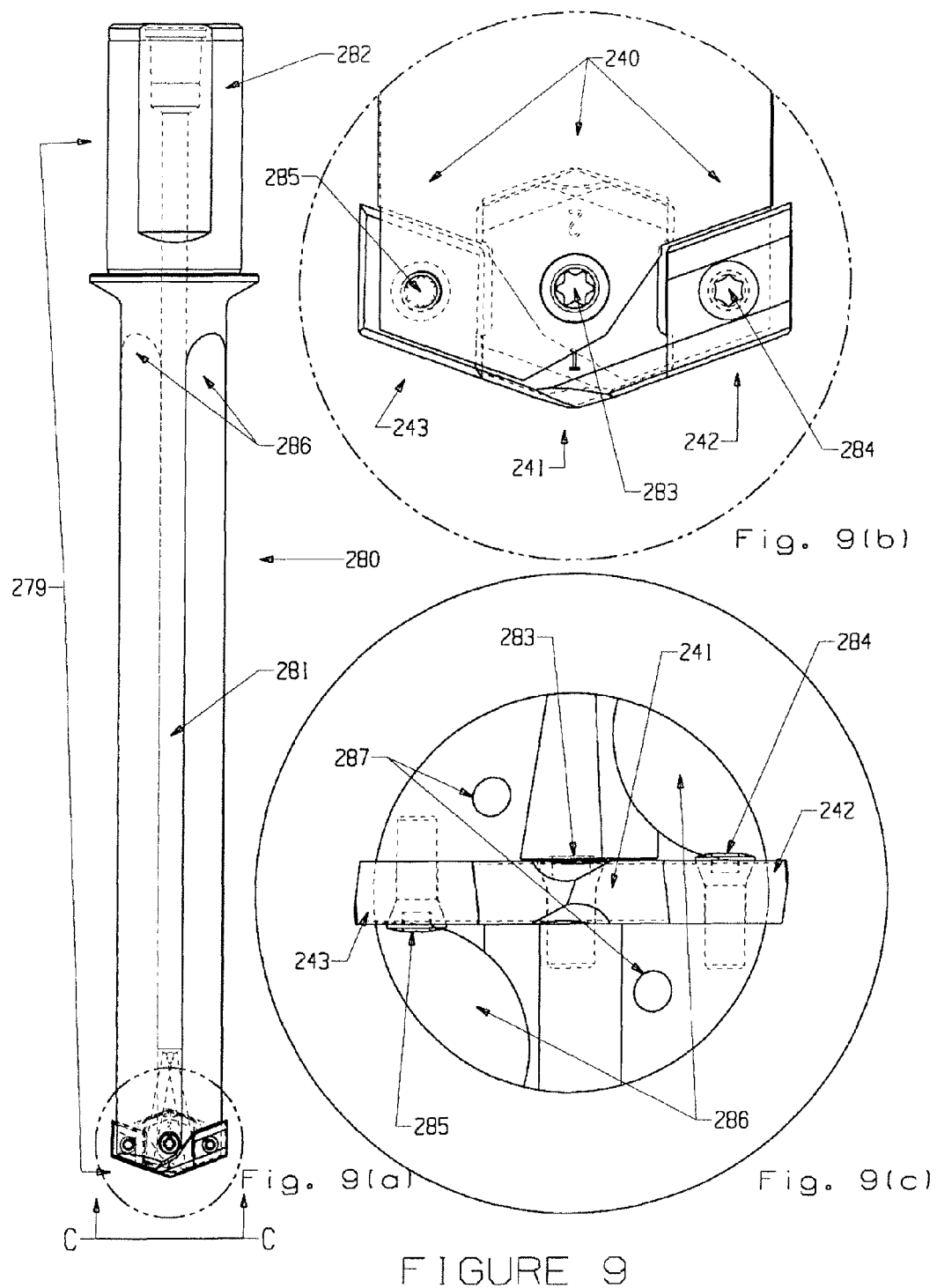
FIGS. 9(a)-(c) schematically depict various aspects of one non-limiting embodiment of a spade drill assembly according to the present disclosure.

FIGS. 9(a)-(c) are schematic illustrations showing aspects of one non-limiting embodiment of a drilling tool assembly or, more simple, a "drill", according to the present disclosure. Drill 279 comprises three-piece drill head 240 (including insert pieces 241, 242, and 243 and as shown in FIGS. 8(a)-(c)) mounted on holder 280. FIG. 9(a) is a schematic plan view of drill 279. FIG. 9(b) is a magnified schematic view of the circled region of drill 279 in FIG. 9(a). FIG. 9(c) is an on-end schematic view of the working end of drill 279, taken in the direction of arrows C-C in FIG. 9(a) and shown using the scale of FIG. 9(b). In each of FIGS. 9(a)-(c) the positions of certain hidden features of drill 279 are indicated in dotted lines. With reference to FIG. 9(a), holder 280 includes body portion 281 and shank portion 282. As shown in FIGS. 9(b) and 9(c), center insert piece 241 and side insert pieces 242 and 243 are secured on a terminal end of body portion 281 by screws 283, 284, and 285, respectively. Body portion 281 includes two chip flutes 286 and two cooling holes 287. Shank portion 282 of body portion 281 of tool holder 280 is adapted so that drill 279 may be attached to a drilling or milling machine.

Insert pieces 241, 242, and 243 may be detached from holder 280 by removing screws 283, 284, and 285, respectively, and may be indexed between alternate cutting orientations, as discussed above. Also, it will be understood that insert pieces 241, 242, and 243 are mated and are not connected together, but rather are separately secured to holder 280 by their respective screws and are individually removable. The mating relationship between side insert pieces 242, 243 and the center insert piece 241, as discussed above, presents a substantially seamless, generally V-shaped cutting edge to the workpiece, despite the fact that the drill head 240 has a multi-piece construction. The multi-piece construction allows for many unique advantages. For example, center insert piece 241 may be separately indexed between alternate cutting orientations. Also, side insert pieces 242 and 243 may be detached, rotated, and their positions exchanged to index their respective cutting edges between alternate cutting orientations, and without the need to also index center insert piece 241. To address wear and/or damage, any of insert pieces 241, 242, and 243 may be individually indexed or replaced, without the need to also index or replace the remaining insert piece(s).

Also, the materials from which the center insert piece 241 and the side insert pieces 242 and 243 are made can differ. Given that the cutting speed of side insert pieces 242 and 243 exceeds that of the center insert piece 241, the forces promoting wear experienced by the insert pieces 242 and 243 will likely exceed those experienced by center insert piece 241. Given the multi-piece (i.e., two or more pieces) construction of drill heads according to the present disclosure, drill head 240, for example, may include side insert pieces 242 and 243 made of a material having greater wear resistance than center insert piece 241, thereby promoting more even wear of drill head 240 across the length of the generally V-shaped cutting edge presented to the workpiece. Even if the individual insert pieces of drill head 240 are composed of like materials and side insert pieces 242 and 243 wear at a rate greater than center insert piece 241, side insert pieces 242 and 243 may be indexed or replaced separately from center insert piece 241. This feature avoids the necessity to replace the entire drill head 240 when only regions of the drill head experience unacceptable wear and/or damage.

Figure 10:
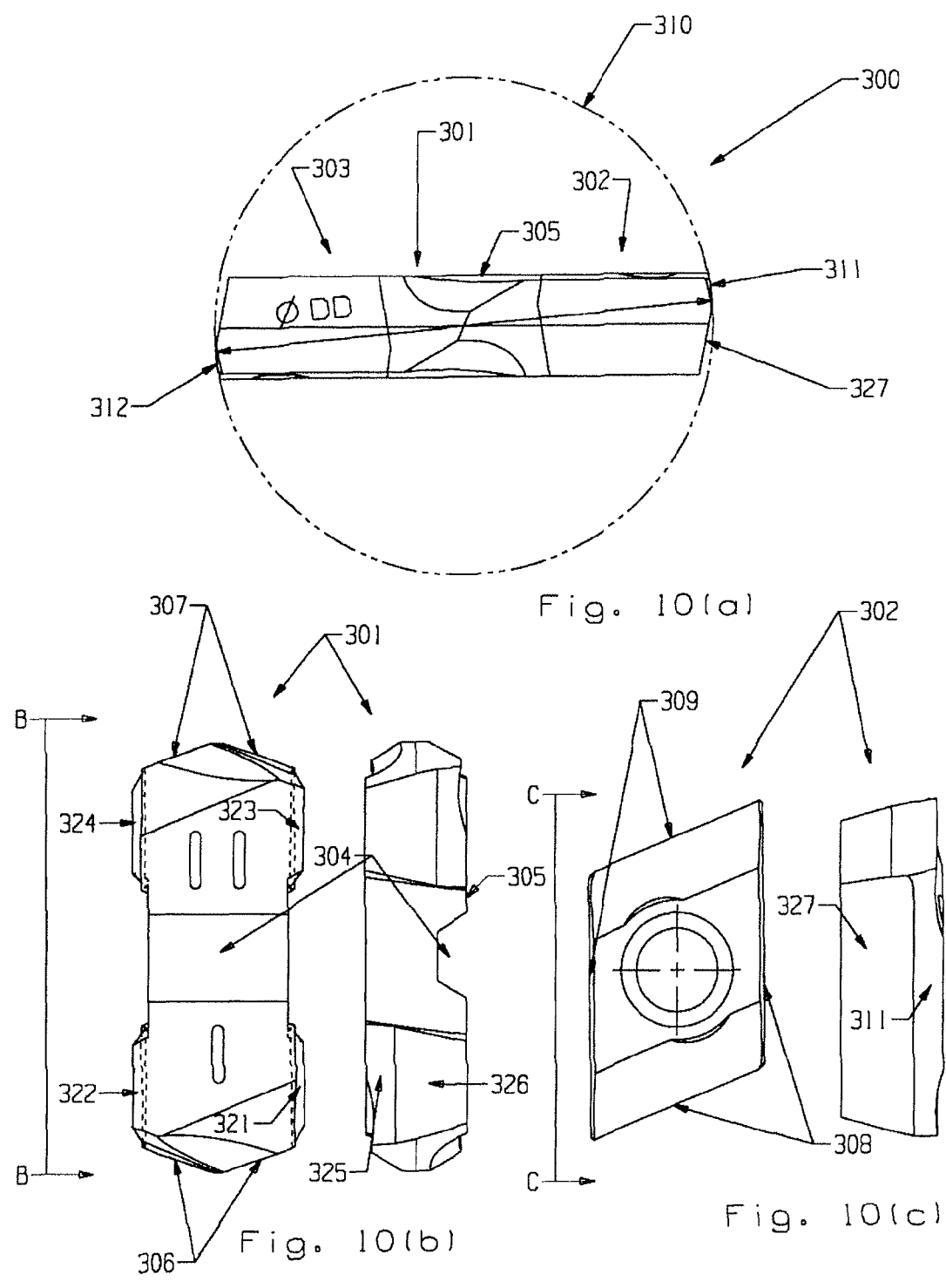
FIGS. 10(a)-(c) schematically depict various aspects of an additional non-limiting embodiment of a multi-piece spade drill head according to the present disclosure.

FIGS. 10(a)-(c) are schematic views showing aspects of an additional non-limiting embodiment of a multi-piece spade drill head according to the present disclosure. Three-piece spade drill head 300 is shown assembled and in a schematic end view in FIG. 10(a) and includes center insert piece 301 and side insert pieces 302 and 303 flanking center insert piece 301. FIG. 10(b) schematically depicts center insert piece 301 in both a first face view (left side of the figure) and a side view (right side of the figure) taken in the direction of arrows B-B adjacent the first face view. In the first face view of FIG. 10(b) the positions of certain hidden features of drill head 300 are indicated in dotted lines. The design of side insert piece 303 is identical to that of side insert piece 302.

Center insert piece 301 does not include a central fastener hole as included in the embodiments discussed above. Instead, as shown in FIG. 10(b), center insert piece 301 includes slot 304 on first face 305 and a set screw or clamp (not shown) attached to the holder may be used to secure the center insert piece 301 into an insert pocket of the holder. Utilizing a center insert piece 301 without a fastener hole is particularly useful in the design of small size multi-piece spade drills according to the present disclosure. Each of the insert pieces 301, 302, and 303 includes two pairs of cutting edges to provide indexing capability of each insert piece between two cutting orientations. As shown in FIG. 10(b), center insert piece 301 includes a first set of cutting edges 306 and a second set of cutting edges 307. As shown in FIG. 10(c), side insert piece 302 (which is identical to side insert piece 303) includes a first set of cutting edges 308 and a second set of cutting edges 309. The drilling diameter 310 of drill head 300, indicated as ODD in FIG. 10(a), is formed by a radial cutting clearance face of side insert piece 302 including a curved face 311, and a radial cutting clearance face of side insert piece 303 including a curved face 312. Each of mating faces 321, 322, 323, and 324 of center insert piece 301, shown in FIG. 10(b), comprises a curved face and a planar face. For example, as shown in the side view of center insert piece 301 in FIG. 10(b), mating face 322 includes curved face 325 and planar face 326, which are complementary in shape to each radial cutting clearance face of the side insert pieces 302 and 303, which each also comprise a curved face and a planar face. For example, curved face 325 and planar face 326 are complementary in shape and may mate with curved clearance face 311 and planar face 327 of side insert piece 302 (see FIG. 10(c)).

Figure 11:
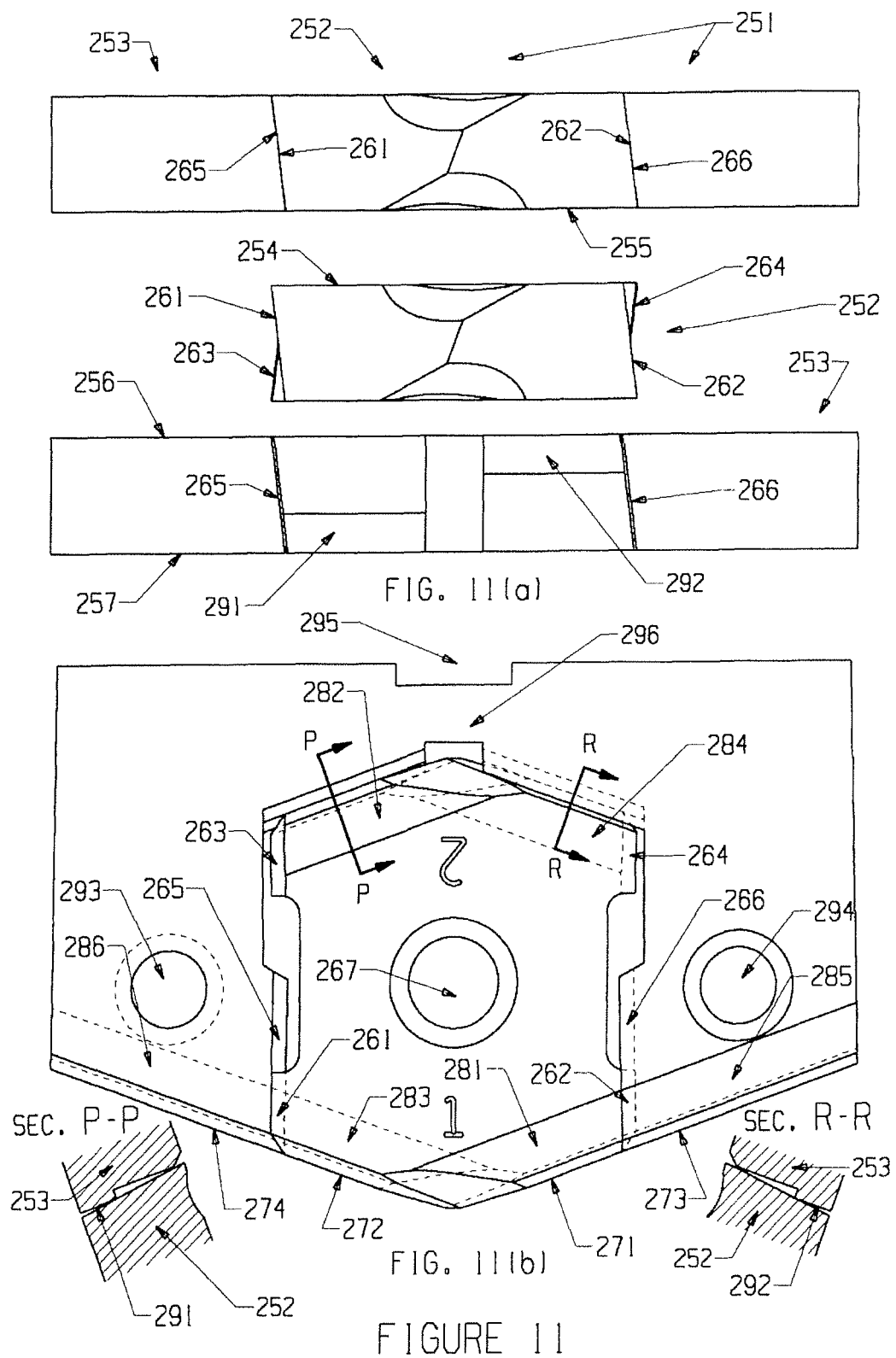
FIGS. 11(a)-(b) schematically depict aspects of an additional non-limiting embodiment of a multi-piece spade drill head according to the present disclosure, wherein the drill head consists of two insert pieces.

FIGS. 11(a)-(b) are schematic views of an additional non-limiting embodiment of a multi-piece spade drill head according to the present disclosure, wherein the drill head includes two insert pieces that mate to together form a generally V-shaped cutting edge of the desired diameter. Two-piece drill head 251 includes center insert piece 252 and a single, generally U-shaped side insert piece 253 mating simultaneously with opposed sides of center insert piece 252. In order to clarify the mating relation between the center insert piece 252 and the side insert piece 253, the top view in FIG. 11(a) showing an end view of the assembled drill head 251 is broken into two separate end views, one showing the center insert piece 252 in isolation and one showing the side insert piece 253 in isolation. FIG. 11(a) includes: an end view of the assembled drill head 251 (top view) showing the end that would be presented to the workpiece; an end view in isolation of the drill head's center insert piece 252 (middle view); and an end view of in isolation of side insert piece 253 (bottom view) that is taken in the same direction as in the top view in FIG. 11(a). FIG. 11(b) includes a first face view of assembled drill head 251 and two sectioned views taken at P-P and R-R in the direction of the arrows. The first face 254 of center insert piece 252 is aligned so as to be substantially coplanar with the top face 256 of side insert piece 253, and the second face 255 of the center insert piece 252 is aligned so as to be substantially coplanar with the bottom face 257 of the side insert piece 253. The center insert piece 252 includes two mating faces 261 and 262 in the region of center insert piece 252 identified by indicia "1". The center insert piece also includes two mating faces 263 and 264 in the region of the center insert piece 251 identified by indicia "2" (see middle view of FIG. 11(a) and FIG. 11(b)). Mating faces 261 and 262 of center insert piece 252 are shown in the top view of FIG. 11(a) and in FIG. 11(b) mated with complementary mating faces 265 and 266, respectively, of side insert piece 253.

In the particular embodiment depicted in FIGS. 11(a) and (b), only center piece insert 252 of drill head 251 is indexable between two cutting orientations. Center insert piece 252 may be indexed from the cutting orientation shown in FIG. 11(b) to a second cutting orientation by rotating center insert piece 252 180° about fastener hole 267 so that the region identified by indicia "2" is oriented toward the workpiece and mating faces 263 and 264 of center insert piece 252 mate with complementary mating faces 265 and 266, respectively, of side insert piece 253.

To form a generally V-shape cutting of the desired cutting diameter, cutting edge 271 of first face 254 of center insert piece 252 is aligned with cutting edge 273 of face 256 of side insert piece 253, and cutting edge 272 of second face 255 of center insert piece 252 is aligned with the cutting edge 274 of face 257 of side insert piece 253. Center insert piece 252 also includes chip grooves 281 and 282 on face 254 and chip grooves 283 and 284 (positions indicated by dashed lines in FIG. 11(b)) on face 255. Side insert piece 253 includes chip groove 285 on face 256 and chip groove 286 (position indicated by dashed line in FIG. 11(b) on face 257. As illustrated in the bottom view of FIG. 11(a), side insert piece 253 includes vertical face 291 proximate face 257 and vertical face 292 proximate face 256. As shown in the Sec. P-P and R-R views of FIG. 11(b), center insert piece 252 leans against vertical faces 291 and 292, which helps to securely interconnect the two insert pieces when the insert pieces are mounted on the drill body of a drill. Center insert piece 252 is secured to a drill body by a screw (not shown) passing through fastener hole 267, and side insert piece 253 is secured to a drill body by two screws (not shown) passing through fastener holes 293 and 294. The side insert piece 253 also comprises a slot 295 used for locating the side insert piece 253 on a drill body and a slot 296 to provide some relief room for a drill tip portion (by indicia "1" or "2") of the center insert piece 252.

Although the multi-piece drill head embodiment 251 includes only two insert pieces and, therefore, does not provide certain advantages of other embodiments described herein including more than two insert pieces, drill head 251 may be constructed so that center piece insert 252 and side insert piece 253 are made of different cemented carbide, hard steel, or other materials. In that way, for example, the different wear conditions at the center and edges of the drill head may be addressed.

Figure 12:
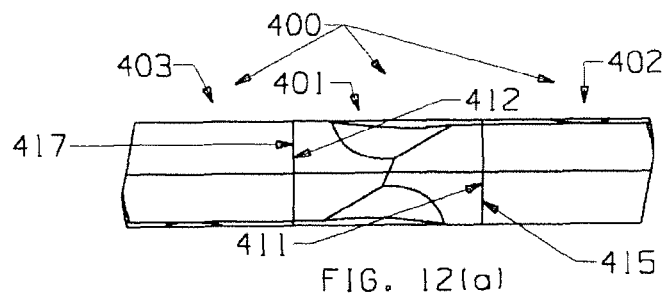
FIGS. 12(a)-(d) are schematic views of an additional non-limiting embodiment of a multi-piece spade drill head according to the present disclosure.
Figure 12:
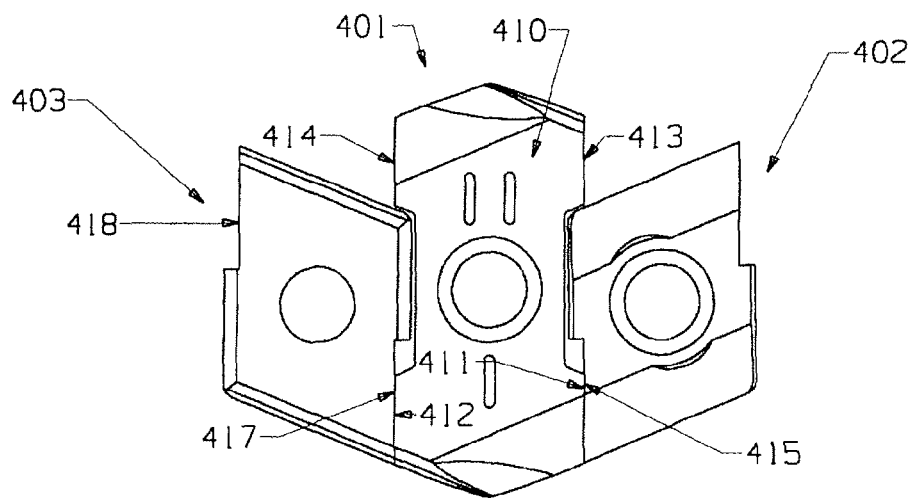
Figure 12:
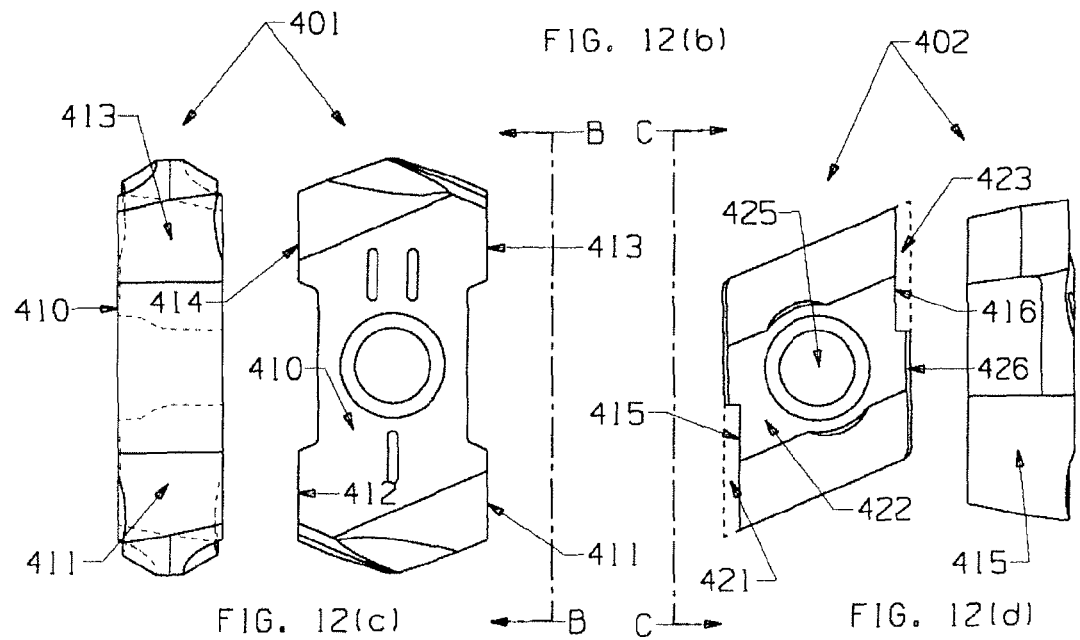

Alternate arrangements for aligning the components of a multi-piece drill heads according to the present disclosure are contemplated. FIGS. 12(a)-(d) are schematic views showing aspects of an additional non-limiting embodiment of a multi-piece spade drill head according to the present disclosure. Three-piece spade drill head 400 is shown in a schematic end view in FIG. 12(a) and in a first face view in FIG. 12(b). Drill head 400 includes center insert piece 401 and side insert pieces 402 and 403 flanking center insert piece 401. FIG. 12(c) schematically depicts center insert piece 401 in both a first face view (right side of the figure) and a side view (left side of the figure) taken in the direction of arrows B-B adjacent the first face view. FIG. 12(d) schematically depicts side insert piece 402 in both a first face view (left side of the figure) and a side view (right side of the figure) taken in the direction of arrows C-C adjacent the first face view. The design of side insert piece 403 is identical to that of side insert piece 402.

Center insert piece 401 includes four vertical planar mating surfaces 411, 412, 413, and 414, all of which are substantially perpendicular to first face 410. Side insert piece 402 includes corresponding complementary surfaces 415 and 416, and side insert piece 403 includes corresponding complementary surfaces 417 and 418. Referring to side insert piece 402 shown in FIG. 12(d), a recessed portion 421 created by removing the region enclosed by dashed lines from side insert piece 402 provides complementary surface 415 at one corner of side insert piece 402. Similarly, a recessed portion 423 created by removing the region enclosed by dashes lines from side insert piece 402 provides complementary surface 416 at a second corner of side insert piece 402. Complementary surfaces 415 and 416 are substantially perpendicular to face 422 and are 180° rotationally symmetric about center hole 425. Thus, as shown in FIG. 12(d), a relatively geometrically simple mating surface, such as mating surface 416, is separated in a radial direction from a relatively geometrically complex cutting face, such as cutting face 426. In the arrangement shown in FIGS. 12(a)-(c), mating surface 411 of center insert piece 401 is mated with complementary surface 415 of side insert piece 402, and mating surface 412 of center insert piece 401 is mated with complementary surface 417 of side insert piece 403.

Certain significant advantages provided by the multi-piece construction of drill heads and drills described herein are discussed above. A significant advantage of the multi-piece construction is that various regions of the drill head may be embodied in separately removable insert pieces. Thus, regions of the drill head that experience forces more aggressively promoting wear and/or breakage may be selectively replaced or indexed to present a new cutting edge to the workpiece. Given that the cutting speed of outer regions of the cutting edge (regions remote from the rotational axis of the drill) is greater than the cutting speed nearer the drill's rotational axis, the outer regions of a drill head typically are subjected to significantly greater wear if the drill head is made of a homogenous material. Once the outer regions of the cutting edge of, for example, a conventional spade drill head have worn or become damaged to an unacceptable degree, the entire drill head (if it is removable) or the entire drill (if the drill head is fixed) must be replaced. In a drill head having the unique multi-piece construction according to the present disclosure, the cutting edge is formed by multiple (i.e., two or more) separately removable insert pieces. Thus, only those insert pieces having cutting edges that suffer from unacceptable wear and/or breakage during use need to be indexed or replaced.

Also, the multi-piece construction described herein allows for the possibility that different insert pieces of a multi-piece drill head according to the present disclosure are made from different materials. For example, with respect to three-piece drill head 240 illustrated in FIGS. 9(a)-(c), side insert pieces 242 and 243 may be made from a cemented carbide or other suitable material having improved wear resistance relative to a cemented carbide or other suitable material from which the center insert piece 241 is made. Also, for example, with respect to two-piece drill head 251 illustrated in FIGS. 11(a)-(b), side insert piece 253 is made from a cemented carbide or other suitable material having improved wear resistance relative the material from which the center insert piece 252 is made. In this way, the greater cutting speeds experienced at the outer regions of the cutting edge may be addressed by enhancing the wear resistance properties in those regions. Also, the ability provided by a multi-piece drill head design to enhance the wear resistance of regions of the drill head subjected to more extreme wear conditions can be used to even the rate of wear experienced along the entire cutting edge. Once the degree of wear along the cutting edge becomes unacceptable, the entire drill head may be replaced (by installing new insert pieces on the drill) or the individual inserts may be indexed to an alternate cutting orientation.

As noted in the Background section above, certain one-piece drill embodiments are known wherein different metallurgically bonded regions of the drill are composed of different composite materials. In this way, the tendency for outer regions, which run at faster cutting speeds, to wear at a faster rate can be addressed by providing composite materials having greater wear resistance in those outer regions. As further note above, however, the production of composite drills requires additional processing steps and expense. The present multi-piece construction can be adapted to provide drill heads having enhanced wear resistance properties in the regions where needed, without the need to produce the drill head as a one-piece, monolithic component. Each of the two or more individually removable insert pieces making up a drill head according to the present disclosure may be made of a single material such as, a single cemented carbide, tool steel, or other suitable material, having mechanical properties (for example, wear resistance, toughness, and strength) desired for the particular region of the drill head.

Although the above embodiments each include two or three separate insert pieces, it will be evident from the present description that drill heads constructed according to the present disclosure may include more than three individually removable insert pieces. For example, to provide further enhanced cutting edge wear resistance as a distance from the rotational axis of the drill head increases, multi-piece drill heads according to the present disclosure may include, for example, a center insert piece and 3 to 7, or more, side insert pieces. In a possible embodiment of a five-piece drill head embodiment according to the present disclosure, for example, the drill head may include: a center insert piece secured to a holder; a pair of first side insert pieces, one such first side insert piece mated against each of the two sides of the center insert piece and separately secured to the tool holder (or, alternatively, a single side insert piece having a generally U-shaped construction similar to that in FIGS. 11(a)-(b)); and a pair of second side insert pieces, one such second side insert piece mated against an outwardly exposed side of each first side insert piece and separately secured to the tool holder. As such, a distance between the outer exposed edges of the two second insert pieces defines the cutting diameter of the drill head. The second insert pieces may be made of cemented carbide or another material having greater wear resistance than the first side insert pieces. The first insert pieces (or piece), in turn, are made of cemented carbide or another material having greater wear resistance than the center insert piece. In this way, the increased cutting speed and consequent increased propensity for wear at positions distant from the rotational axis of the drill head are counteracted by the progressively enhanced wear resistance properties of the first and second insert pieces. The center insert piece, first side insert pieces (or piece), and second insert pieces may be separately replaced and/or may be designed so as to be indexable between two or more cutting orientations to present a new cutting edge to the workpiece when wear and/or damage to the cutting edge becomes unacceptable.

Accordingly, embodiments of multi-piece drill heads and drills according to the present disclosure may be designed with a wide range of geometric features that a conventional one-piece solid drill or indexable drill insert may posses. Embodiments of multi-piece drill heads according to the present disclosure may be, for example, of conventional size and adapted for conventional use in a variety of drilling applications.

It will be understood that the present description illustrates those aspects of the invention relevant to a clear understanding of the invention. Certain aspects that would be apparent to those of ordinary skill in the art and that, therefore, would not facilitate a better understanding of the invention, have not been presented in order to simplify the present description. For example, it will be understood that the insert pieces and other components making up multi-piece drill heads and drills according to the present disclosure may be made from conventional materials using conventional manufacturing techniques known to those having ordinary skill in the art. As such, possible manufacturing techniques will be readily known to those of ordinary skill upon considering the present description and are not described herein.

Also, although only a limited number of embodiments of multi-piece drill heads according to the present description necessarily are described herein, one of ordinary skill in the art will, upon considering the foregoing description, recognize that many modifications and variations of the invention may be employed. All such variations and modifications of the invention are intended to be covered by the foregoing description and the following claims. The foregoing examples of possible designs for multi-piece drill heads and drilling assemblies according to the present disclosure are offered by way of example only, and are not exhaustive of all designs within the scope of the present disclosure. Those having ordinary skill, upon reading the present disclosure, may readily identify additional designs that are embodiments within the scope of the present disclosure. It is understood, therefore, that this invention is not limited to the particular embodiments disclosed herein, but it is intended to cover modifications that are within the principle and scope of the invention, as defined by the claims.

What is claimed is:

1. A multi-piece spade drill head for a spade drill, the spade drill comprising an elongate body portion and a cutting portion removably secured to an end of the body portion, the multi-piece spade drill head comprising:
   at least three insert pieces, each insert piece including a cutting edge, wherein the at least three insert pieces are configured to be removably secured to the body portion adjacent one another with endpoints of cutting edges of the insert pieces aligned to abut and form straight, continuous cutting edge regions on an end of the spade drill, and wherein at least one of the insert pieces comprises two cutting edges and is indexable and securable to the body portion in at least two alternate cutting orientations.

2. The multi-piece spade drill head of claim 1, wherein in each of the two alternate cutting orientations a different cutting edge is aligned to abut with cutting edges of the remaining insert pieces to form the straight, continuous cutting edge regions when the at least three insert pieces are removably secured to the body portion of the spade drill.

3. The multi-piece spade drill head of claim 1 comprising a center insert piece and two side insert pieces, wherein the two side insert pieces are configured to be removably secured to the body portion mated with opposed sides of the center insert piece.

4. The multi-piece spade drill head of claim 3, wherein each side insert piece includes a mating surface configured to mate with a complementarily shaped region of a side of the center insert piece when the center insert piece and side insert pieces are removably secured to the body portion of the spade drill.

5. The multi-piece spade drill head of claim 4, wherein in each of the two alternate cutting orientations a different cutting edge is aligned to abut with cutting edges of the remaining insert pieces to form the straight, continuous cutting edge regions when the inserts are removably secured to the body portion of the spade drill.

6. The multi-piece spade drill head of claim 5, wherein each of the three insert pieces is made of material individually selected from a cemented carbide material and a hard steel.

7. The multi-piece spade drill head of claim 6, wherein at least two of the insert pieces are made of different materials.

8. The multi-piece spade drill head of claim 1, wherein each of the insert pieces is made of material individually selected from a cemented carbide material and a hard steel.

9. The multi-piece spade drill head of claim 8, wherein at least two of the insert pieces are made of different materials.

10. The multi-piece spade drill head of claim 1 comprising a center insert piece made of a first material and two side insert pieces made of a second material, wherein the two side insert pieces are configured to be removably secured to the body portion of the spade drill mated with opposed sides of the center insert piece, and wherein the second material has greater wear resistance than the first material.

11. The multi-piece spade drill head of claim 10, wherein in each of the two alternate cutting orientations a different cutting edge is aligned to abut with cutting edges of the remaining insert pieces to form the straight, continuous cutting edge regions when the inserts are removably secured to the body portion of the spade drill.

12. The multi-piece spade drill head of claim 1, wherein each of the center insert piece and the side insert pieces is made of material individually selected from a cemented carbide material and a hard steel.

13. A multi-piece spade drill head for a spade drill, the spade drill comprising a body portion and a drill head removably secured to the body portion, the multi-piece spade drill head comprising:
   a center insert piece forming a central region of the spade drill head, the center insert piece including first and second sides and a cutting edge;
   a first side insert piece forming at least a portion of a first side region of the spade drill head, the first side insert piece comprising a cutting edge and a mating surface configured to mate with at least a region of the first side of the center insert piece; and
   a second side insert piece forming at least a portion of a second side region of the spade drill head, the second side insert piece comprising a cutting edge and a mating surface configured to mate with at least a region of the second side of the center insert piece;
   wherein the center insert piece, the first side insert piece, and the second side insert piece are configured to be individually removably secured to the body portion with the mating surface of the first side insert piece mated to the first side of the center insert piece and the mating surface of the second side insert piece mated to the second side of the center insert piece with endpoints of cutting edges of the insert pieces aligned to abut and form straight, continuous cutting edge regions on an end of the spade drill;
   wherein at least one of the center insert piece, the first side insert piece, and the second side insert piece includes two cutting edges and is indexable and securable to the body portion in at least two alternate cutting orientations.

14. The multi-piece spade drill head of claim 13, wherein in each of the two alternate cutting orientations a different cutting edge is aligned to abut with cutting edges of the remaining at least one of the center insert piece, the first side insert piece, and the second side insert piece to form the straight, continuous cutting edge regions on the end of the spade drill when the inserts are removably secured to the body portion of the spade drill.

15. The multi-piece spade drill head of claim 13, wherein the mating surface of the first side insert piece and mating surface of the second side insert each mate with a complementary-shaped region of the center insert piece.

16. The multi-piece spade drill head of claim 13, wherein each of the center insert piece, the first side insert piece, and the second insert piece is individually made of a material selected from a cemented carbide material and a hard steel.

17. The multi-piece spade drill head of claim 16, wherein at least two inserts selected from the center insert piece, the first side insert piece, and the second insert piece are made of different materials.

18. The multi-piece spade drill head of claim 17, wherein the center insert piece is made of a first material and the first side insert piece and the second side insert piece are made of a second material, and wherein the second material has greater wear resistance than the first material.

19. The multi-piece spade drill head of claim 13, wherein the center insert piece is made of a first material and the first side insert piece and the second side insert piece are made of a second material, and wherein the second material has greater wear resistance than the first material.

20. A spade drill comprising:
   an elongated body portion including a shank portion at a first end and a second end configured to removably receive a drill head; and a removable multi-piece spade drill head comprising at least three insert pieces, each insert piece including a cutting edge and individually removably secured to the second end of the body portion adjacent one another and with endpoints of cutting edges of the insert pieces aligned to abut and form straight, continuous cutting edge regions on the second end of the body portion of the spade drill, wherein at least one of the three insert pieces includes two cutting edges and is indexable and securable to the body portion in at least two alternate cutting orientations.

21. The spade drill of claim 20, wherein in each of the two alternate cutting orientations a different cutting edge is aligned to abut with cutting edges of the remaining insert pieces to form the straight, continuous cutting edge regions on the second end of the spade drill when the insert pieces are removably secured to the body portion of the spade drill.

22. The spade drill of claim 20, wherein the multi-piece spade drill head comprises a center insert piece and two side insert pieces, wherein the two side insert pieces are removably secured to the body portion mated with opposed sides of the center insert piece.

23. The spade drill of claim 20, wherein each side insert piece includes a mating surface mated with a complementarily shaped region of a side of the center insert piece.

24. The spade drill of claim 23, wherein in each of the two alternate cutting orientations a different cutting edge is aligned to abut with cutting edges of the remaining insert pieces to form the straight, continuous cutting edge regions when the insert pieces are removably secured to the second end of the body portion.

25. The spade drill of claim 20, wherein each of the center insert piece and the two side insert pieces of the spade drill head is made of a material individually selected from a cemented carbide material and a hard steel.

26. The spade drill of claim 25, wherein at least two of the center insert piece and the two side insert pieces of the spade drill head are made of different materials.

27. The spade drill of claim 26, wherein the center insert piece is made of a first material and the side insert pieces are made of a second material, and wherein the second material has greater wear resistance than the first material.

28. A spade drill comprising
an elongated body portion including a shank portion at a first end and a second end configured to removably receive a drill head, and
a removable multi-piece spade drill head comprising:
a center insert piece forming a central region of the spade drill head, the center insert piece including first and second sides and a cutting edge;
a first side insert piece forming at least a portion of a first side region of the spade drill head, the first side insert piece comprising a cutting edge and a mating surface configured to mate with at least a region of the first side of the center insert piece; and
a second side insert piece forming at least a portion of a second side region of the spade drill head, the second side insert piece comprising a cutting edge and a mating surface configured to mate with at least a region of the second side of the center insert piece;
wherein the center insert piece, the first side insert piece, and the second side insert piece are individually removably secured to the body portion with the mating surface of the first side insert mated to the first side of the center insert piece and the mating surface of the second side insert piece mated to the second side of the center insert piece to align to abut endpoints of a cutting edge of the center insert piece with endpoints of cutting edges of the first side insert piece and the second side insert piece to form straight, continuous cutting edge regions on the second end of the spade drill; and
wherein at least one of the center insert piece, the first side insert piece, and the second side insert piece includes two cutting edges and is indexable and securable to the body portion in at least two alternate cutting orientations.

29. The spade drill of claim 28, wherein in each of the two alternate cutting orientations a different cutting edge is aligned to abut with cutting edges of the remaining at least one of the center insert piece, the first side insert piece, and the second side insert piece to form the straight, continuous cutting edge regions on the second end of the body portion of the spade drill.

30. The spade drill of claim 29, wherein each of the center insert piece, the first side insert piece, and second side insert piece of the spade drill head is individually made of a material selected from a cemented carbide material and a hard steel.

31. The spade drill of claim 30, wherein at least two of the center insert piece, the first side insert piece, and second side insert piece of the spade drill head are made of different materials.

32. The spade drill of claim 28, wherein the mating surface of the first side insert piece and mating surface of the second side insert piece each mate with a complementary-shaped region of the center insert piece.

33. The spade drill of claim 28, wherein the center insert piece is made of a first material and the first side insert piece and second side insert piece are made of a second material, and wherein the second material has greater wear resistance than the first material.

34. A multi-piece spade drill head for a spade drill, the spade drill comprising an elongate body portion and a cutting portion removably secured to an end of the body portion, the multi-piece spade drill head comprising:
a center insert piece comprising a V-shaped cutting edge; and
a side insert piece comprising two side regions separated by a recess, each side region including a cutting edge;
wherein the center insert piece and the side insert piece are configured to be removably secured to the body portion of the spade drill with the center insert piece disposed in the recess of and mating with the side insert piece and so that the cutting edge of the center insert piece and the cutting edge of each of the side regions of the side insert piece are aligned to together form a cutting edge on a terminal portion of the spade drill; and
wherein the center insert piece includes a plurality of cutting edges and is configured to be individually indexable and secured to the body portion in two cutting orientations, wherein in each cutting orientation a different V-shaped cutting edge of the center insert piece is aligned with cutting edges of the side regions of the side insert piece to form the cutting edge on the terminal portion of the spade drill when the inserts are removably secured to the body portion of the spade drill.

35. The multi-piece spade drill head of claim 34, wherein each side region of the side insert piece includes a mating surface configured to mate with a complementarily shaped region of a side of the center insert piece when the center insert piece and side insert piece are removably secured to the body portion of the spade drill with the center insert piece disposed in the recess of the side insert piece.

36. The multi-piece spade drill head of claim 34, wherein the center insert piece and the side insert piece are made of a material individually selected from a cemented carbide material and a hard steel.

37. The multi-piece spade drill head of claim 36, wherein the center insert piece and the side insert piece are made of different materials.

38. The multi-piece spade drill head of claim 37, wherein the center insert piece is made of a first material, the side insert piece is made of a second material, and the second material has greater wear resistance than the first material.

39. The multi-piece spade drill head of claim 34, wherein the cutting edge on the terminal portion of the spade drill is continuous.

40. A spade drill comprising
   an elongated body portion including a shank portion at a first end and a second end configured to removably receive a drill head, and
   a removable multi-piece spade drill head comprising:
      a center insert piece comprising a V-shaped cutting edge; and
      a side insert piece comprising two side regions separated by a recess, each side region including a cutting edge;
      wherein the center insert piece and the side insert piece are configured to be removably secured to the body portion of the spade drill with the center insert piece disposed in the recess of and mating with the side insert piece and so that the V-shaped cutting edge of the center insert piece and the cutting edge of each of the side regions of the center insert piece are aligned to together form a cutting edge on the second end of the spade drill, and
      wherein the center insert piece includes a plurality of cutting edges and is configured to be individually indexable and secured to the body portion in two cutting orientations, wherein in each cutting orientation a different V-shaped cutting edge of the center insert piece is aligned with cutting edges of the side regions of the side insert piece to form the cutting edge on the second end of the spade drill when the inserts are removably secured to the body portion of the spade drill.

41. The spade drill of claim 40, wherein each side region of the side insert piece includes a mating surface configured to mate with a complementarily shaped region of a side of the center insert piece when the center insert piece and side insert piece are removably secured to the body portion of the spade drill with the center insert piece disposed in the recess of the side insert piece.

42. The spade drill of claim 40, wherein the center insert piece and the side insert piece are made of a material individually selected from a cemented carbide material and a hard steel.

43. The spade drill of claim 42, wherein the center insert piece and the side insert piece are made of different materials.

44. The spade drill of claim 43, wherein the center insert piece is made of a first material, the side insert piece is made of a second material, and the second material has greater wear resistance than the first material.

45. The spade drill head of claim 40, wherein the cutting edge on the second end of the spade drill is continuous.

* * * * *